(12) United States Patent
Matsushima

(10) Patent No.: US 11,108,616 B2
(45) Date of Patent: Aug. 31, 2021

(54) REMOTE MANAGEMENT MEDIATING APPARATUS, REMOTE MANAGEMENT SYSTEM, AND REMOTE MANAGEMENT METHOD

(71) Applicant: Hiroyuki Matsushima, Kanagawa (JP)

(72) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 200 days.

(21) Appl. No.: 16/521,751

(22) Filed: Jul. 25, 2019

(65) Prior Publication Data

US 2020/0044908 A1 Feb. 6, 2020

(30) Foreign Application Priority Data

Jul. 31, 2018 (JP) .............................. JP2018-144474

(51) Int. Cl.
*G05B 19/4155* (2006.01)
*G05B 19/418* (2006.01)
*H04L 12/24* (2006.01)

(52) U.S. Cl.
CPC ........ *H04L 41/042* (2013.01); *G05B 19/4155* (2013.01); *G05B 19/4185* (2013.01); *H04L 41/0213* (2013.01); *H04L 41/0813* (2013.01)

(58) Field of Classification Search
CPC ............... H04L 41/042; H04L 41/0213; H04L 41/0813; G05B 19/4155; G05B 19/4185
See application file for complete search history.

(56) References Cited

U.S. PATENT DOCUMENTS

| 2012/0239821 A1* | 9/2012 | Hozumi ................ H04L 67/125 709/238 |
| 2018/0278463 A1 | 9/2018 | Negishi |
| 2019/0109921 A1 | 4/2019 | Matsushima |

FOREIGN PATENT DOCUMENTS

| JP | 2009-032277 | 2/2009 |
| JP | 2018077725 A * | 5/2018 |
| JP | 2018-156581 | 10/2018 |

* cited by examiner

*Primary Examiner* — Chad G Erdman
(74) *Attorney, Agent, or Firm* — IPUSA, PLLC

(57) ABSTRACT

A remote management mediating apparatus, a remote management system, and a remote management method. The remote management mediating apparatus receives request data issued from a remote device management apparatus to one or more management target devices remotely managed by the remote device management apparatus, identifies a device mediating apparatus capable of communicating by a communication method supported by the management target device, and transfers the received request data to the identified device mediating apparatus and when the device mediating apparatus is replaced with another device mediating apparatus, acquires settings information for remote management set in the device mediating apparatus, supplies the settings information to the another device mediating apparatus, and resets the settings information to the another device mediating apparatus.

8 Claims, 15 Drawing Sheets

FIG. 6A

| REGISTRATION NUMBER | APPLICATION ID | DEVICE MEDIATING APPARATUS ID | USED |
|---|---|---|---|
| 112231 | APPLICATION_A | GATEWAY12345 | X |
| 112232 | APPLICATION_B | GATEWAY12346 | X |
|  |  |  |  |
|  |  |  |  |

FIG. 6B

| REGISTRATION NUMBER | APPLICATION ID | DEVICE MEDIATING APPARATUS ID | USED |
|---|---|---|---|
| 112231 | APPLICATION_A | GATEWAY12345 | X |
| 112232 | APPLICATION_B | GATEWAY12346 | X |
| 112233 | APPLICATION_A |  |  |
|  |  |  |  |

FIG. 6C

| REGISTRATION NUMBER | APPLICATION ID | DEVICE MEDIATING APPARATUS ID | USED |
|---|---|---|---|
| 112231 | APPLICATION_A | GATEWAY12345 | X |
| 112232 | APPLICATION_B | GATEWAY12346 | X |
| 112233 | APPLICATION_A | GATEWAY12347 | X |
|  |  |  |  |

FIG. 8

| DEVICE MEDIATING APPARATUS IDENTIFIER | MANAGEMENT TARGET DEVICE IDENTIFIER |
|---|---|
| GATEWAY12345 | DEVICE111111 |
| GATEWAY12345 | DEVICE222222 |
| GATEWAY12345 | DEVICE333333 |
| GATEWAY12348 | DEVICE444444 |
| GATEWAY12348 | DEVICE555555 |
| GATEWAY12348 | DEVICE666666 |
| ⋮ | ⋮ |

FIG. 9

| ITEM | DESCRIPTION |
|---|---|
| COMMUNICATION PROTOCOL TYPE | COMMUNICATION PROTOCOL THAT CAN BE USED SUCH AS HTTP AND SNMP |
| AVAILABLE DEVICE TYPE | TYPE OF MANAGEMENT TARGET DEVICE THAT CAN USE THE COMMUNICATION METHOD |
| COMMUNICATION PORT | COMMUNICATION PORT SUCH AS 80/TCP |
| COMMUNICATION PROTOCOL DETAILED DEFINITION | DETAILED DEFINITION OF COMMUNICATION PROTOCOL |

FIG. 10

| ITEM | DESCRIPTION |
|---|---|
| DEVICE IDENTIFIER | INFORMATION TO UNIQUELY IDENTIFY THE DEVICE SUCH AS MAC ADDRESS |
| DEVICE TYPE | TYPE OF THE DEVICE USED TO ASSOCIATE WITH COMMUNICATION METHOD DEFINITION |
| IP ADDRESS | IP ADDRESS OF THE DEVICE |
| ADDITIONAL INFORMATION | INFORMATION SUCH AS MONITORING INTERVAL AND NETWORK I/F |

| REQUEST ID | APPLICATION ID | DEVICE MEDIATING APPARATUS ID |
|---|---|---|
| REQUEST1 | APPLICATION_A | GATEWAY12345 |
| REQUEST2 | APPLICATION_B | GATEWAY12346 |

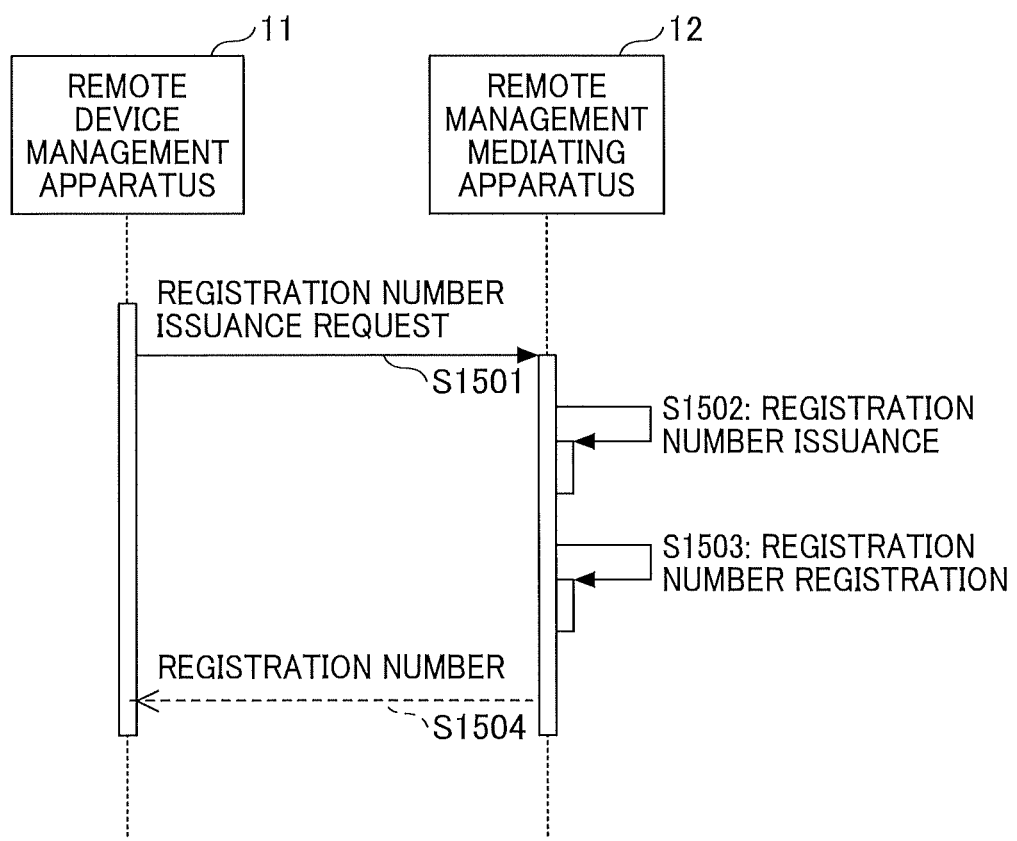

FIG. 16A

| REGISTRATION NUMBER | APPLICATION ID | DEVICE MEDIATING APPARATUS ID | USED |
|---|---|---|---|
| 112231 | APPLICATION_A | GATEWAY12345 | X |
| 112232 | APPLICATION_B | GATEWAY12346 | X |
| 112233 | APPLICATION_A | GATEWAY12347 | X |
| 112234 | APPLICATION_A | GATEWAY12347 | |

FIG. 16B

| REGISTRATION NUMBER | APPLICATION ID | DEVICE MEDIATING APPARATUS ID | USED |
|---|---|---|---|
| 112231 | APPLICATION_A | GATEWAY12345 | X |
| 112232 | APPLICATION_B | GATEWAY12346 | X |
| 112233 | APPLICATION_A | GATEWAY12347 | X |
| 112234 | APPLICATION_A | GATEWAY12347 | X |

REMOTE MANAGEMENT MEDIATING APPARATUS, REMOTE MANAGEMENT SYSTEM, AND REMOTE MANAGEMENT METHOD

CROSS-REFERENCE TO RELATED APPLICATIONS

This patent application is based on and claims priority pursuant to 35 U.S.C. § 119(a) to Japanese Patent Application No. 2018-144474, filed on Jul. 31, 2018 in the Japan Patent Office, the entire disclosure of which is hereby incorporated by reference herein.

BACKGROUND

Technical Field

The present disclosure relates to a remote management mediating apparatus, a remote management system, and a remote management method.

Background Art

A remote management system can remotely manage various electronic devices connected to a network as a management target device. In such a remote management system, a mediating apparatus is installed inside a firewall to remotely manage the electronic device in the firewall from outside of the firewall.

For example, a mediating apparatus that is provided in a local area network where the firewall is provided receives a management command transmitted from the management apparatus by the mediating apparatus through the firewall, and device data acquired from the electronic device according to the management command is transmitted to the management apparatus through the Internet. According to this technique, the management apparatus can remotely manage the electronic device in the local area provided with the firewall.

SUMMARY

Embodiments of the present disclosure describe a remote management mediating apparatus, remote management system, and remote management method. The remote management mediating apparatus receives request data issued from a remote device management apparatus to one or more management target devices remotely managed by the remote device management apparatus, identifies a device mediating apparatus capable of communicating by a communication method supported by the management target device, and transfers the received request data to the identified device mediating apparatus and when the device mediating apparatus is replaced with another device mediating apparatus, acquires settings information for remote management set in the device mediating apparatus, supplies the settings information to the another device mediating apparatus, and resets the settings information to the another device mediating apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 6A, FIG. 6B, and FIG. 6C are diagrams illustrating an example of second association information (registration number management table) stored in an association information storage unit in the remote management system according to the first embodiment of the present disclosure;

FIG. 8 is a diagram illustrating an example of first association information stored in the association information storage unit in the remote management system according to the first embodiment of the present disclosure;

FIG. 9 is a diagram illustrating an example of a data structure of communication method definition information stored in a communication method definition information storage unit in the remote management system according to the first embodiment of the present disclosure;

FIG. 10 is a diagram illustrating an example of a data structure of management target device information stored in a management target device information storage unit in the remote management system according to the first embodiment of the present disclosure;

FIG. 15 is a sequence diagram illustrating a registration number reissue process executed by the remote management system according to the first embodiment of the present disclosure;

FIG. 16A and FIG. 16B are diagrams illustrating an example of the second association information (registration number management table) stored in the association information storage unit in the remote management system according to the first embodiment of the present disclosure;

Figure 1:
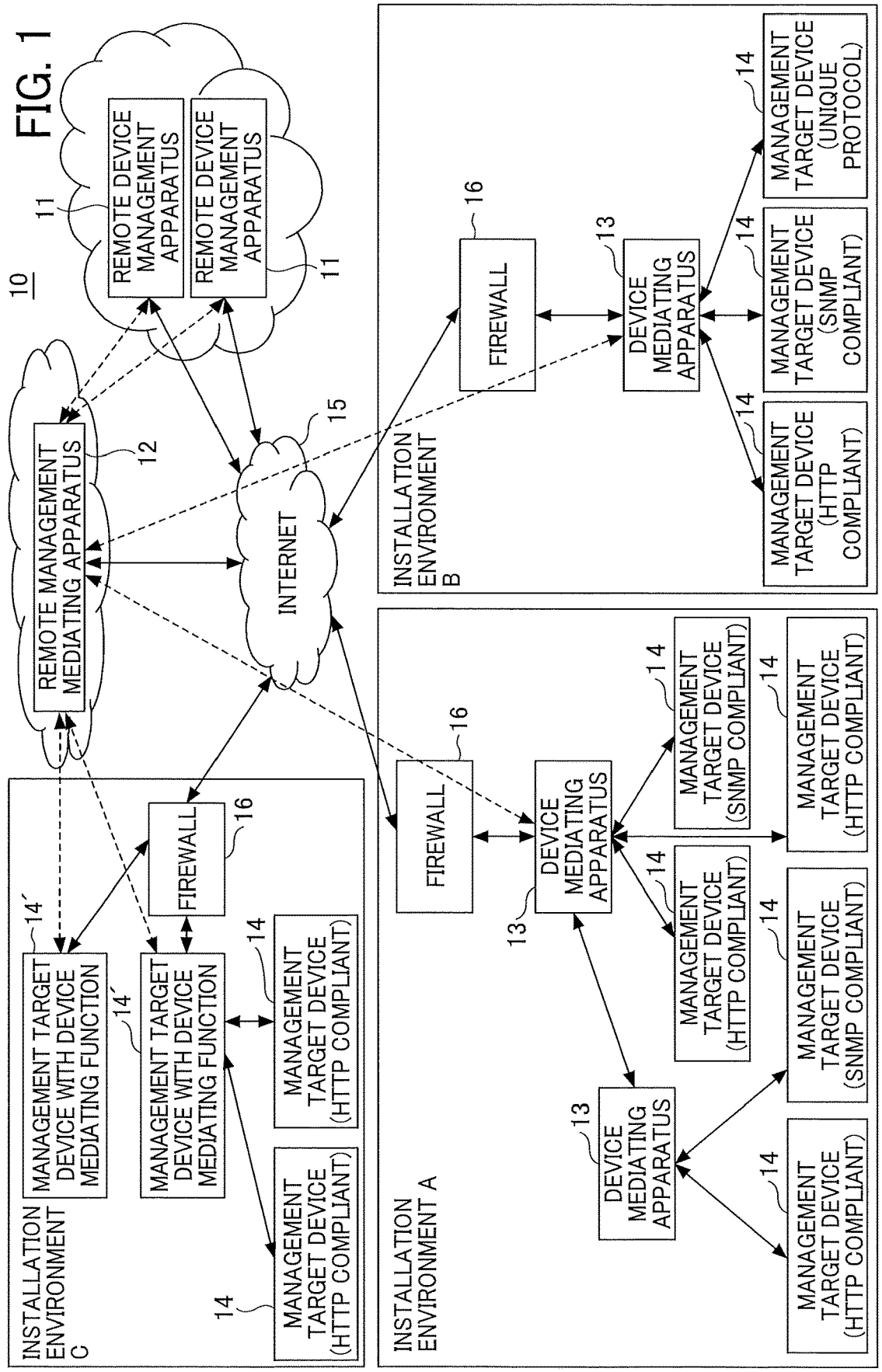
FIG. 1 is a diagram illustrating an overall configuration of a remote management system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

First Embodiment

Hereinafter, a description is given of a first embodiment of the present disclosure with reference to the drawings.

Overall Configuration of Remote Management System

FIG. 1 is a diagram illustrating an overall configuration of a remote management system 10 according to a first embodiment of the present disclosure. The remote management system 10 illustrated in FIG. 1 can remotely manage a plurality of management target devices 14 installed in a plurality of installation environments A to C from the remote device management apparatus 11 through the internet 15 and the firewall 16.

As illustrated in FIG. 1, the remote management system 10 includes a plurality of remote device management apparatuses 11, a remote management mediating apparatus 12, a plurality of device mediating apparatuses 13, and a plurality of management target devices 14. The management target device 14' is the management target device 14 to which the same function as the device mediating apparatus 13 is added.

The remote device management apparatus 11 is a device operated by the remote device manager and capable of remotely monitoring and operating the management target device 14. The remote device management apparatus 11 holds device information on the management target device 14 to be managed and service definition information on a service provided by the remote device management apparatus 11.

For example, the service definition information includes event information such as regular life-and-death monitoring events and regular information collection events, frequency information for event occurrence, and information definitions to be acquired from the management target device 14 and the like. The service definition information also includes communication method definition information and the like for the device mediating apparatus 13 to communicate with the management target device 14.

The services provided by the remote device management apparatus 11 include, for example, device status display for remote maintenance, abnormal status display, device settings value update, device usage report, device log information for device developers, remote firmware update of device, office management to manage air conditioning and lighting in the office, and the like can be considered. The remote device management apparatus 11 can also provide a service in cooperation with another web service.

The remote management mediating apparatus 12 plays the role of mediating communication data between the remote device management apparatus 11 and the device mediating apparatus 13. For example, the remote management mediating apparatus 12 acquires request data issued from the remote device management apparatus 11 to the management target device 14 and transfers the request data to the device mediating apparatus 13 communicably connected to the management target device 14. In addition, the remote management mediating apparatus 12 receives response data output from the management target device 14 from the device mediating apparatus 13 and transfer the response data to the remote device management apparatus 11.

In the present embodiment, Hypertext Transfer Protocol (HTTP) is used for communication between the remote management mediating apparatus 12 and the remote device management apparatus 11 and communication between the remote management mediating apparatus 12 and the device mediating apparatus 13. However, the present disclosure is not limited to using the HTTP protocol, and other communication protocols (for example, WebSocket, Message Queuing Telemetry Transport (MQTT), etc.) may be used as long as the protocol can be used for these communications.

The device mediating apparatus 13 is installed in the same local area network as the management target device 14 connected to the device mediating apparatus 13. In response to receiving the request data transferred from the remote management mediating apparatus 12 through the internet 15 and the firewall 16, the device mediating apparatus 13 communicates with the management target device 14 using the communication method supported by the management target device 14.

The device mediating apparatus 13 sends various request data received from the remote device management apparatus 11 (for example, operating instructions such as settings changes, firmware updates, power on, power off, etc., status of management target device 14, and request data to acquire information such as settings value information, log information, etc.) to the management target device 14, or acquire various response data from the management target device 14.

For example, the device mediating apparatus 13 establishes a connection with the remote management mediating apparatus 12 using a communication protocol such as HTTP, WebSocket, or HTTP2. The device mediating apparatus 13 may not be implemented by a dedicated device, but may be implemented instead by software installed in, for example, another device such as a server, a BOX device, a management target device 14 or the like.

Moreover, communication with the remote management mediating apparatus 12 by the device mediating apparatus 13 may not be through the internet 15, and, for example, a public wireless line such as 3G or Long Term Evolution (LTE) may be used. In this case, connection may be made from an access point of a communication carrier using a Virtual Private Network (VPN).

When the management target device 14 is newly added, communication method definition information on the communication method supported by the management target device 14 and management target device information for which the communication settings information regarding the management target device 14 is set are dynamically set and registered in the device mediating apparatus 13. Thus, the device mediating apparatus 13 can communicate with the newly added management target device 14 by referring to the communication method definition information and the management target device information.

The management target device 14 is an electronic device having a communication function and which is a management target of the remote device management apparatus 11. For example, an image forming apparatus (printer, fax machine, multifunction peripheral, scanner), network home appliance, office device (projector, electronic whiteboard), vending machine, medical device, power supply device, air conditioner, measuring instrument for gas, water, electricity, etc., may be the management target device 14. The management target device 14 has a communication function based on a specific communication protocol such as HTTP, Simple Network Management Protocol (SNMP), Internet Control Message Protocol (ICMP), or MQTT, depending on the type of the device.

Hardware Configuration of Each Device in Remote Management System

Figure 2:
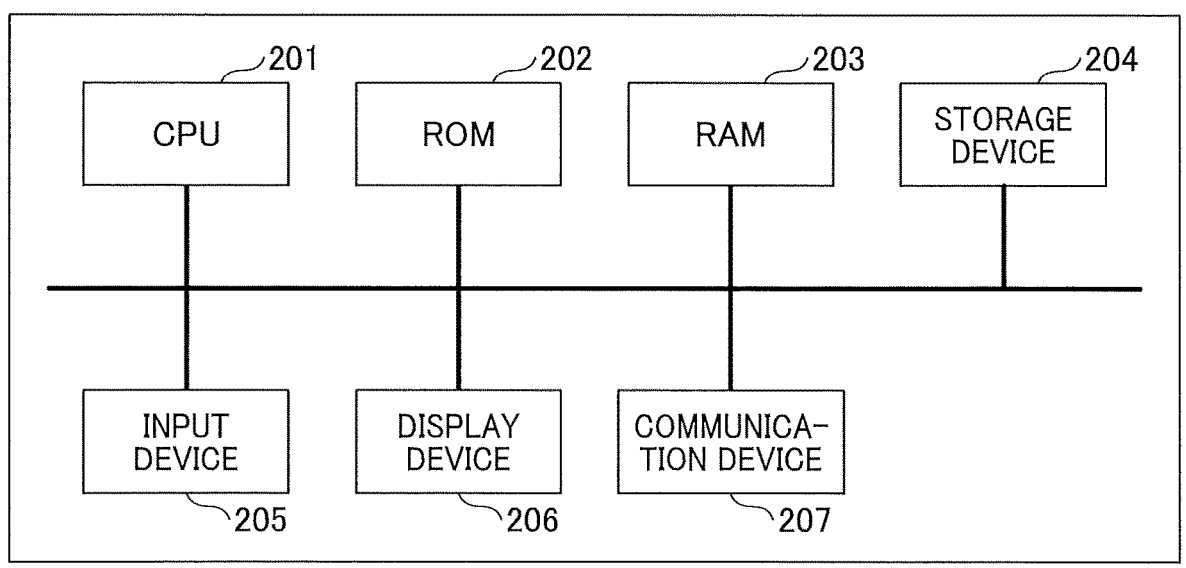
FIG. 2 is a diagram illustrating a hardware configuration of each device in the remote management system according to the first embodiment of the present disclosure.

FIG. 2 is a diagram illustrating a hardware configuration of each device in the remote management system 10 according to the first embodiment of the present disclosure. As illustrated in FIG. 2, the remote device management apparatus 11, the remote management mediating apparatus 12, the device mediating apparatus 13, and the management target device 14 include a central processing unit (CPU) 201, a read only memory (ROM) 202, a random access memory (RAM) 203, a storage device 204, an input device 205, a display device 206, and a communication device 207. Each piece of hardware is connected to every other through a bus.

The CPU 201 executes various programs stored in the ROM 202 or the storage device 204. The ROM 202 is a non-volatile memory. For example, the ROM 202 stores various programs executed by the CPU 201, data necessary for the CPU 201 to execute various programs, and the like. The RAM 203 is a main storage device such as a dynamic random access memory (DRAM) or a static random access memory (SRAM). For example, the RAM 203 functions as a work area, used when the CPU 201 executes various programs.

The storage device 204 is a non-volatile storage device. For example, the storage device 204 stores various programs executed by the CPU 201, data necessary for the CPU 201 to execute various programs, and the like. The input device 205 is an interface for an operator (for example, a device manager, an operator, or the like) to input various instructions. The display device 206 is a device that displays various information (for example, various remote management screens in the remote device management apparatus 11). The communication device 207 is an interface that communicates with another device through a network.

The remote management mediating apparatus 12, the device mediating apparatus 13, and the management target device 14 need not include the input device 205 and the display device 206 but may instead be provided with the input device 205 and the display device 206 for the operator to input various instructions according to the functions.

Functional Configuration Including Each Device in Remote Management System

Figure 3:
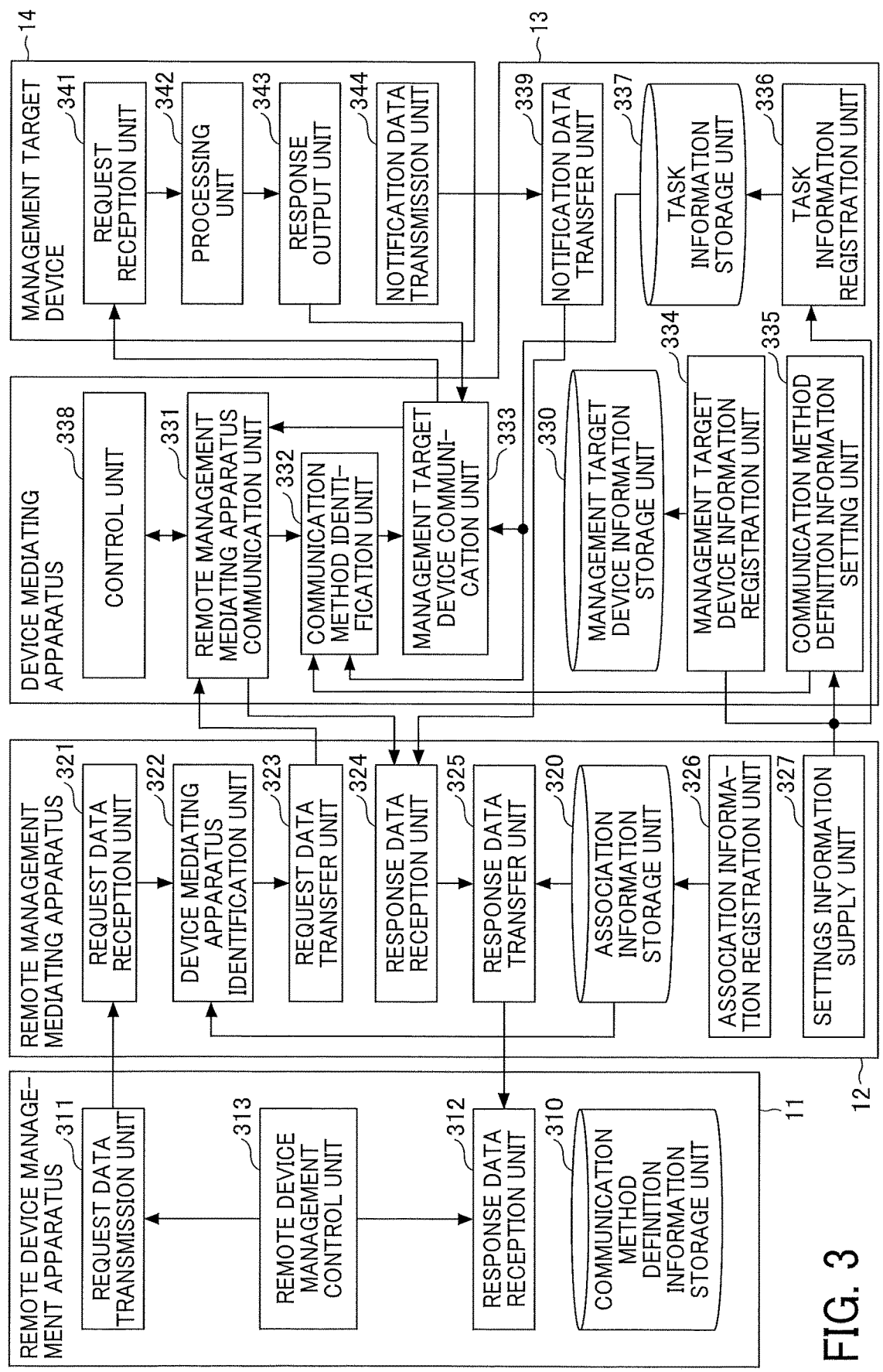
FIG. 3 is a diagram illustrating a functional configuration including each device in the remote management system according to the first embodiment of the present disclosure.

FIG. 3 is a diagram illustrating a functional configuration including each device in the remote management system 10 according to the first embodiment of the present disclosure.

Functions of Remote Device Management Apparatus

As illustrated in FIG. 3, the remote device management apparatus 11 includes a communication method definition information storage unit 310, a request data transmission unit 311, a response data reception unit 312, and a remote device management control unit 313.

The communication method definition information storage unit 310 stores communication method definition information in which the communication method (for example, communication protocol, communication port, etc.) used for communication between the device mediating apparatus 13 and the management target device 14 is defined. The specifics of the communication method definition information are described below with reference to FIG. 9.

The request data transmission unit 311 transmits request data for the management target device 14 to the remote management mediating apparatus 12. The response data reception unit 312 receives response data from the management target device 14 transferred from the remote management mediating apparatus 12.

The remote device management control unit 313 exerts overall control of the remote management by the remote device management apparatus 11. For example, when an instruction to a certain management target device 14 input by an operator is received by the remote device management apparatus 11, the remote device management control unit 313 instructs the request data transmission unit 311 to transmit the request data for the management target device 14. Further, when the response data reception unit 312 receives the response data from the management target device 14, the remote device management control unit 313 may execute response handling processing (for example, error detection processing, device control processing when an error occurs, etc.) based on the response data.

Also, the remote device management control unit 313 acquires information from the management target device 14 based on the service definition information set in advance in the remote device management apparatus 11. For example, in the service definition information, identification information of the management target device 14 from which the information is acquired, information to be acquired, an acquisition frequency, and the like are set. In addition, the remote device management control unit 313 displays various lists of the plurality of management target devices 14 managed by the remote device management apparatus 11 (for example, a list of management target devices 14 in which a malfunction has occurred, management target device 14 used by a specific customer, etc.).

Function of Remote Management Mediating Apparatus

As illustrated in FIG. 3, the remote management mediating apparatus 12 includes an association information storage unit 320, a request data reception unit 321, a device mediating apparatus identification unit 322, a request data transfer unit 323, a response data reception unit 324, and a response data transfer unit 325, an association information registration unit 326, and a settings information supply unit 327.

The association information storage unit 320 stores association information (first association information) that associates the management target device 14 and the device mediating apparatus 13 (device mediating apparatus 13 capable of performing communication by a communication method supported by the management target device 14). A specific example of the first association information is described below with reference to FIG. 8. Further, the association information storage unit 320 stores association information (second association information) in which the remote device management apparatus 11 and the device mediating apparatus 13 are associated with each other. A specific example of the second association information is described below with reference to FIG. 6.

The request data reception unit 321 receives the request data for the management target device 14 transmitted from the remote device management apparatus 11.

The device mediating apparatus identification unit 322 identifies a device mediating apparatus 13 capable of performing communication using the communication method supported by the management target device 14. Specifically, the device mediating apparatus identification unit 322 refers to the first association information stored in the association information storage unit 320 and identifies the device mediating apparatus 13 associated with the management target device 14 of the destination of the request data in the first association information as the device mediating apparatus 13 which can perform communication using the communication method supported by the management target device 14.

The request data transfer unit 323 transfers the request data received by the request data reception unit 321 to the device mediating apparatus 13 identified by the device mediating apparatus identification unit 322.

The response data reception unit 324 receives the response data from the management target device 14 transmitted from the device mediating apparatus 13.

The response data transfer unit 325 transfers the response data received by the response data reception unit 324 to the remote device management apparatus 11. At this time, the response data transfer unit 325 refers to the second association information stored in the association information storage unit 320 and identifies the remote device management apparatus 11 associated with the device mediating apparatus 13 of the transmission source of the response data in the second related information as the remote device management apparatus 11 of the transmission destination of the response data.

When the management target device 14 is newly added, the association information registration unit 326 adds the association between the newly added management target device 14 and the device mediating apparatus 13 capable of communicating with the management target device 14 to the first association information stored in the association information storage unit 320.

When the device mediating apparatus 13 is replaced, the settings information supply unit 327 acquires settings information for remote management (in the present embodiment, task execution information, management target device information, and communication method definition information) that was set in the device mediating apparatus 13 before replacement. By supplying the settings information to the device mediating apparatus 13 after replacement, the settings information is reset in the device mediating apparatus 13 after replacement.

Function of Device Mediating Apparatus

As illustrated in FIG. 3, the device mediating apparatus 13 includes a management target device information storage unit 330, a remote management mediating apparatus communication unit 331, a communication method identification unit 332, a management target device communication unit 333, and a management target device information registration unit 334, a communication method definition information setting unit 335, a task information registration unit 336, a task information storage unit 337, a control unit 338, and a notification data transfer unit 339.

The management target device information storage unit 330 stores management target device information in which communication settings information related to the management target device 14 managed by the device mediating apparatus 13 is set. The specifics of the management target device information are described below with reference to FIG. 10.

The remote management mediating apparatus communication unit 331 communicates with the remote management mediating apparatus 12. Thus, the remote management mediating apparatus communication unit 331 receives the request data transmitted from the remote management mediating apparatus 12. Also, the remote management mediating apparatus communication unit 331 transmits response data from the management target device 14 received by the management target device communication unit 333 to the remote management mediating apparatus 12. In the present embodiment, the HTTP protocol is used for communication between the remote management mediating apparatus 12 and the remote management mediating apparatus communication unit 331. However, other communication protocols (for example, WebSocket, HTTP2, etc.) may be used.

The communication method identification unit 332 identifies a communication method and communication settings used for communication with the management target device 14. Specifically, the communication method identification unit 332 identifies the communication method and communication settings used for communication with the management target device 14 based on the communication method definition information set in the device mediating apparatus 13 using the communication method definition information setting unit 335 and the management target device information registered in the management target device information storage unit 330 by the management target device information registration unit 334.

The management target device communication unit 333 communicates with the management target device 14 according to the communication method and the communication settings identified using the communication method identification unit 332. Thereby, the management target device communication unit 333 transmits the request data received by the remote management mediating apparatus communication unit 331 to the management target device 14. Also, the management target device communication unit 333 receives the response data output from the management target device 14.

When a management target device 14 is newly added, the management target device information registration unit 334 registers the management target device information on the newly added management target device 14 in the management target device information storage unit 330, in response to a request from the remote device management apparatus 11.

When the management target device 14 is newly added, the communication method definition information setting unit 335 sets the communication method definition information of the newly added management target device 14 to the device mediating apparatus 13 in response to a request from the remote device management apparatus 11.

The task information registration unit 336 registers task execution information in the task information storage unit 337. The task information storage unit 337 stores the task execution information registered by the task information registration unit 336. Specifically, when the device mediating apparatus 13 receives a registration request for task execution information from the remote device management apparatus 11, the task information registration unit 336 of the device mediating apparatus 13 registers the task information in the task information storage unit 337.

For example, the following information is set in the task execution information.

Task execution: enabled/disabled

Task execution definition: information collection, life-and-death monitoring, etc.

Task execution timing: once a day/once a week/once a month/at regular intervals

Task execution time (when "task execution timing" is once a day/once a week/once a month)

Task execution interval (when "task execution timing" is a fixed interval)

For example, when "enabled" is set to "task execution", and when the task execution timing specified by "task execution timing", "task execution time", and "task execution interval" has arrived, first, the communication method identification unit 332 identifies the communication method and communication settings used for communication with the management target device 14. Then, the management target device communication unit 333 communicates with the management target device 14 according to the communication method and the communication settings identified using the communication method identification unit 332. Through this communication, the management target device communication unit 333 performs processing (for example, information collection, life-and-death monitoring, etc.) set in the "task execution definition" on the management target device 14. Then, when the management target device communication unit 333 receives the processing result from the management target device 14, the remote management mediating apparatus communication unit 331 transmits the processing result to the remote device management apparatus 11 through the remote management mediating apparatus 12.

The device mediating apparatus 13 executes such a series of processes each time the task execution timing specified by the "task execution timing", the "task execution time", and the "task execution interval" comes. As a result, the remote device management apparatus 11 can periodically obtain information on the management target device 14 by registering the task execution information in the device mediating apparatus 13.

The control unit 338 controls various operations of the device mediating apparatus 13. For example, when the remote management mediating apparatus communication unit 331 receives a restart request transmitted from the remote management mediating apparatus 12, the control unit 338 restarts the device mediating apparatus 13.

The notification data transfer unit 339 transfers the notification data (for example, notification data for reporting a malfunction in the management target device 14) transmitted by the notification data transmission unit 344 of the management target device 14 to the remote management mediating apparatus 12.

Function of Management Target Device

As illustrated in FIG. 3, the management target device 14 includes a request reception unit 341, a processing unit 342, a response output unit 343, and a notification data transmission unit 344.

The request reception unit 341 accepts request data from the remote device management apparatus 11 by receiving the request data transmitted from the device mediating apparatus 13.

The processing unit 342 executes various processes in response to a request from the remote device management apparatus 11 received by the request reception unit 341. For example, the processing unit 342 performs its own operations (for example, settings changes, firmware updates, power on, power off, etc.) and outputs various information (for example, status of management target device 14, settings value information, output log information, etc.).

The response output unit 343 outputs response data according to the processing results provided by the processing unit 342 to the device mediating apparatus 13.

The notification data transmission unit 344 transmits notification data to the device mediating apparatus 13. For example, when a malfunction occurs in the management target device 14, the notification data transmission unit 344 transmits notification data for reporting a malfunction to the device mediating apparatus 13.

Each function of the remote management system 10 described above is implemented by the remote device management apparatus 11, the remote management mediating apparatus 12, the device mediating apparatus 13, or various hardware included in the management target device 14 (see FIG. 2). Specifically, the communication method definition information storage unit 310, the association information storage unit 320, and the management target device information storage unit 330 are implemented by the storage device 204. The other functions are implemented by the CPU 201 executing a program stored in the ROM 202 or the storage device 204.

The program may be introduced in advance to the remote device management apparatus 11, the remote management mediating apparatus 12, the device mediating apparatus 13, or the management target device 14, or may be provided externally and introduced into the remote device management apparatus 11, the remote management mediating apparatus 12, the device mediating apparatus 13, or the management target device 14. In the latter case, the program may be provided via an external storage medium (for example, Universal Serial Bus (USB) memory, memory card, Compact Disc-Read Only Memory (CD-ROM), etc.) or it may be provided by downloading from a server on a network such as the internet, etc.

Remote Management Process Executed by Remote Management System

Figure 4:
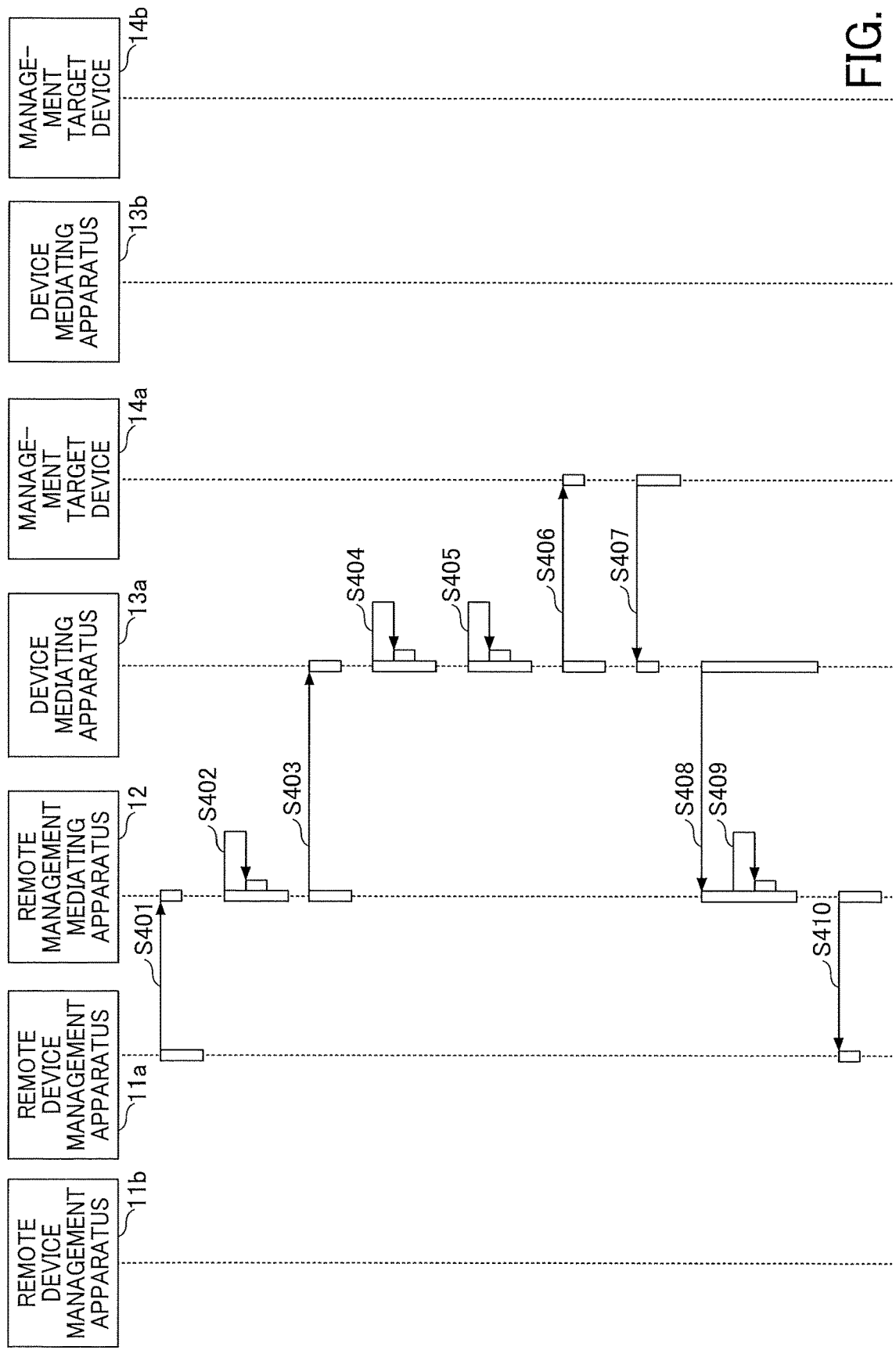
FIG. 4 is a sequence diagram illustrating a process of remote management by the remote management system according to the first embodiment of the present disclosure.

FIG. 4 is a sequence diagram illustrating a process of remote management by the remote management system 10 according to the first embodiment. The process illustrated in FIG. 4 is started, for example, when an instruction for a certain management target device 14 is input to the remote device management apparatus 11 by the device manager. Alternatively, the process illustrated in FIG. 4 may be periodically started based on, for example, service definition information set in the remote device management apparatus 11.

In FIG. 4, an example in which the remote device management apparatus 11a acquires specific information from the management target device 14a by transmitting an information acquisition request (an example of request data) to the management target device 14a is illustrated.

In the communication method definition information stored in the communication method definition information storage unit 310, "SNMP protocol" is defined as the communication method supported by the management target device 14a. Further, in the first association information stored in the association information storage unit 320, "device mediating apparatus 13a" is set as the device mediating apparatus 13 supporting the management target device 14a. Also, in the second association information stored in the association information storage unit 320, "remote device management apparatus 11a" is set as the remote device management apparatus 11 supporting the device mediating apparatus 13a.

First, in the remote device management apparatus 11a, the request data transmission unit 311 transmits an information acquisition request for the management target device 14a to the remote management mediating apparatus 12 (step S401).

In the remote management mediating apparatus 12, when the request data reception unit 321 receives the information acquisition request transmitted from the remote device management apparatus 11a, the device mediating apparatus identification unit 322 identifies the device mediating apparatus 13 supporting the management target device 14a based on the first association information stored in the association information storage unit 320 (step S402). In the example of FIG. 4, "device mediating apparatus 13a" is identified as the device mediating apparatus 13 supporting the management target device 14a.

Then, the request data transfer unit 323 transfers the information acquisition request to the device mediating apparatus 13a (step S403).

In the device mediating apparatus 13a, when the remote management mediating apparatus communication unit 331 receives the information acquisition request transmitted from the remote management mediating apparatus 12, the communication method identification unit 332 identifies the management target device 14a as an information acquisition destination based on the identification information of the management target device 14a indicated in the information acquisition request (step S404). Then, based on the identification information of the management target device 14a, the communication method definition information, and the management target device information, the communication method identification unit 332 identifies the communication method and communication settings to be used for communication with the management target device 14a (step S405).

In the example of FIG. 4, "SNMP protocol" is identified as the communication method to be used for communication with the management target device 14a. Further, the management target device communication unit 333 communicates with the management target device 14a using the communication method ("SNMP protocol") and the communication settings identified in step S404 to send the information acquisition request to the management target device 14a (step S406).

In the management target device 14a, when the request reception unit 341 receives the information acquisition request transmitted from the device mediating apparatus 13a, the processing unit 342 extracts information corresponding to the information acquisition request from the memory or the like, and the response output unit 343 outputs response data including this information to the device mediating apparatus 13a (step S407).

Then, in the device mediating apparatus 13a, when the management target device communication unit 333 receives the response data from the management target device 14a, the remote management mediating apparatus communication unit 331 transmits the response data to the remote management mediating apparatus 12 (step S408).

In the remote management mediating apparatus 12, when the response data reception unit 324 receives the response data transmitted from the device mediating apparatus 13a, the response data transfer unit 325 identifies the remote device management apparatus 11a as the transfer destination of the response data based on the identification information of the device mediating apparatus 13a indicated in the response data and the second association information stored in the association information storage unit 320 (step S409).

Then, the response data transfer unit 325 transfers the response data to the remote device management apparatus 11a (step S410). Then, in the remote device management apparatus 11a, when the response data reception unit 312 receives the response data transmitted from the remote management mediating apparatus 12, the remote management system 10 completes the process illustrated in FIG. 4.

The remote device management apparatus 11a can process the information contained in the response data (that is, the information extracted in the management target device 14a) in various ways depending on the purpose of the information acquisition, such as display, storage, calculation, analysis, transmission, printing, etc.

Figure 5:
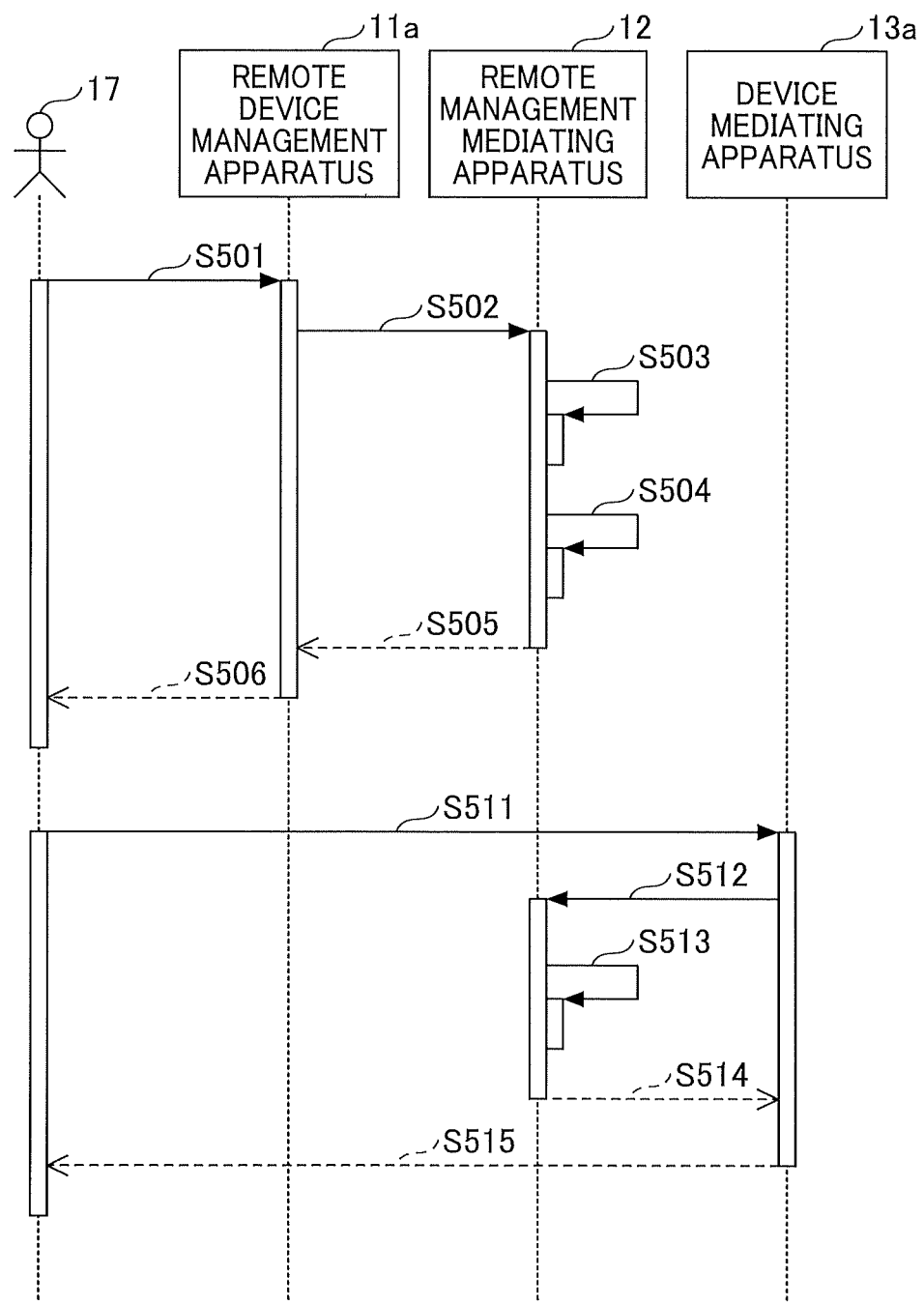
FIG. 5 is a sequence diagram illustrating a process of configuring the device mediating apparatus executed by the remote management system according to the first embodiment of the present disclosure.

Device Mediating Apparatus Configuration Process Executed by Remote Management System With reference to FIG. 5, FIG. 6A, FIG. 6B, and FIG. 6C, a process of configuring of the device mediating apparatus by the remote management system 10 is described. FIG. 5 is a sequence diagram illustrating a process of configuring the device mediating apparatus executed by the remote management system 10 according to the first embodiment. FIG. 6A, FIG. 6B, and FIG. 6C are diagrams illustrating an example of second association information (registration number management table) stored in the association information storage unit 320 in the remote management system 10 according to the first embodiment. Here, an example in which the remote device management apparatus 11a (device management application) is associated with the device mediating apparatus 13a in the second association information and registered in the association information storage unit 320 (registration number management table) of the remote management mediating apparatus 12 is described.

First, the second association information (registration number management table) stored in the association information storage unit 320 is described with reference to FIG. 6A, FIG. 6B, and FIG. 6C.

As illustrated in FIG. 6A, FIG. 6B, and FIG. 6C, a registration number management table is stored in the association information storage unit 320, and second association information is registered in the registration number management table. The second association information is information that associates the remote device management apparatus 11 with the device mediating apparatus 13. The registration number management table (second association information) includes "registration number", "application identifier (ID)", "device mediating apparatus ID", and "used" as data items. The "registration number" is identification information for uniquely identifying the second association information and is issued when the second association information is registered. The "application ID" is an identifier of the remote device management apparatus 11*a*. The "device mediating apparatus ID" is an identifier of the device mediating apparatus 13*a*. "Used" is set to "X (used flag)" when the registration number is used (i.e., the device mediating apparatus ID is registered).

The registration number management table illustrated in FIG. 6A, FIG. 6B, and FIG. 6C is referred to when the response data transfer unit 325 of the remote management mediating apparatus 12 identifies the remote device management apparatus 11 as the transfer destination of the response data received from the device mediating apparatus 13. For example, when the device mediating apparatus ID of the device mediating apparatus 13 that is the transmission source of the response data is "Gateway 12345", the response data transfer unit 325 determines the transfer destination of the response data as the remote device management apparatus 11 whose application ID is "APPLICATION_A" based on the registration number management table illustrated in FIG. 6A.

With reference to FIG. 5, FIG. 6A, FIG. 6B, and FIG. 6C, a process of configuring the device mediating apparatus 13 by the remote management system 10 is described. FIG. 6A illustrates a registration number management table before registration of second association information by the process of configuring the device mediating apparatus executed by the mediating apparatus 13 described below. FIG. 6B and FIG. 6C illustrate the registration number management tables after the registration of the second association information by the process of configuring the device mediating apparatus executed by mediating apparatus 13 described below.

First, the device manager 17 inputs an instruction for issuing a registration number to the remote device management apparatus 11*a* (step S501). In response to this input, the request data transmission unit 311 of the remote device management apparatus 11*a* transmits a registration number issuance request to the remote management mediating apparatus 12 (step S502).

In the remote management mediating apparatus 12, when the request data reception unit 321 receives the registration number issuance request, the association information registration unit 326 issues a registration number (step S503). Then, the association information registration unit 326 associates the registration number issued in step S503 with the remote device management apparatus 11*a* (step S504). For example, in step S503, it is assumed that "112233" is issued as a registration number. Further, it is assumed that an application ID which is an identifier of the remote device management apparatus 11*a* (device management application) is "APPLICATION_A". In this case, in step S504, as illustrated in FIG. 6B, the association information registration unit 326 associates the registration number "112233" with the application ID "APPLICATION_A" and registers the same in the association information storage unit 320 (registration number management table) of the remote management mediating apparatus 12.

In step S505, in the remote management mediating apparatus 12, the response data transfer unit 325 notifies the remote device management apparatus 11*a* of the registration number "112233" issued in step S503. In the remote device management apparatus 11*a*, when the response data reception unit 312 receives the registration number transmitted from the remote management mediating apparatus 12, the issued registration number "112233" is notified to the device manager 17 (step S506).

Next, the device manager 17 inputs the registration number "112233" to the device mediating apparatus 13*a* (step S511). In response to this input, the device mediating apparatus 13*a* notifies the remote management mediating apparatus 12 of the input registration number "112233" and the identifier of the device mediating apparatus 13*a* (step S512).

When the remote management mediating apparatus 12 receives this notification, the association information registration unit 326 associates the identifier of the remote device management apparatus 11*a* having the notified registration number "112233" with the identifier of the notified device mediating apparatus 13*a* as second association information and the second association information is registered in the association information storage unit 320 (registration number management table) of the remote management mediating apparatus 12 (step S513). For example, when the device mediating apparatus ID of the device mediating apparatus 13*a* is "Gateway 12347", in step S513, as illustrated in FIG. 6C, the association information registration unit 326 associates the registration number "112233" registered in the registration number management table in step S504 with the application ID "APPLICATION_A" as second association information, further associates the device mediating apparatus ID "Gateway 12347", and sets "X (used flag)" in the data item "used".

Thereafter, the remote management mediating apparatus 12 transmits a registration completion notification of the second association information to the device mediating apparatus 13*a* (step S514). Furthermore, the device mediating apparatus 13*a* notifies the remote device management apparatus 11*a* of the registration result of the second association information (step S515). When the registration number notified from the device mediating apparatus 13*a* has been used, the remote management mediating apparatus 12 returns an error to the device mediating apparatus 13*a* in step S514.

For example, the device mediating apparatus 13 is often shipped directly from the factory or warehouse to the user, and the device mediating apparatus 13 and the remote device management apparatus 11 may not be associated before shipment. In such a case, when the user installs the device mediating apparatus 13, it is necessary to set up the association. FIG. 5 illustrates a safe and easy way to associate the device mediating apparatus 13 and the remote device management apparatus 11 using the registration number.

Process of Adding Management Target Device by Remote Management System

Figure 7:
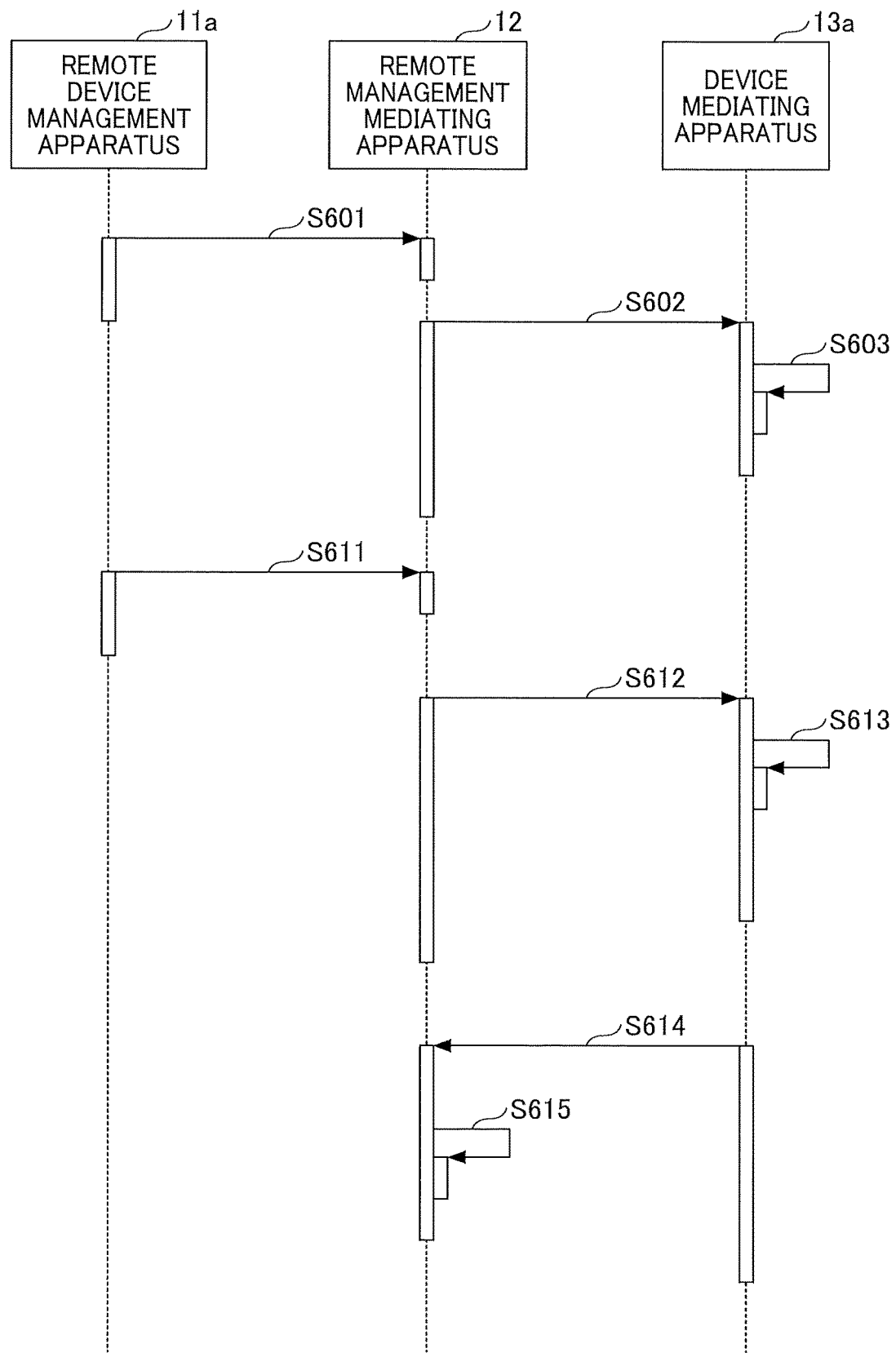
FIG. 7 is a sequence diagram illustrating a process of adding a management target device executed by the remote management system according to the first embodiment of the present disclosure.

FIG. 7 is a sequence diagram illustrating a process of adding a management target device 14 by the remote management system 10 according to the first embodiment. An example in which communication method definition information and management target device information regarding the management target device 14*a* are added to the device mediating apparatus 13*a* in response to the addition of the management target device 14*a* is described.

First, the remote device management apparatus 11*a* (request data transmission unit 311) transmits a request for setting communication method definition information on the management target device 14a to the remote management mediating apparatus 12 (step S601). In the remote management mediating apparatus 12, when the request data reception unit 321 receives the request for setting the communication method definition information on the management target device 14a transmitted from the remote device management apparatus 11a, the request data transfer unit 323 transfers the setting request to the device mediating apparatus 13a (step S602).

In the device mediating apparatus 13a, when the remote management mediating apparatus communication unit 331 receives the setting request of the communication method definition information on the management target device 14a transmitted from the remote management mediating apparatus 12, the communication method definition information setting unit 335 sets communication method definition information on the management target device 14a in the device mediating apparatus 13a (step S603).

Next, the remote device management apparatus 11a (the request data transmission unit 311) transmits the request for adding management target device information related to the management target device 14a to the remote management mediating apparatus 12 (step S611). In the remote management mediating apparatus 12, when the request data reception unit 321 receives the request to add management target device information related to the management target device 14a transmitted from the remote device management apparatus 11a, the request data transfer unit 323 transfers the request to the device mediating apparatus 13a (step S612).

In the device mediating apparatus 13a, when the remote management mediating apparatus communication unit 331 receives the request to add management target device information related to the management target device 14a transmitted from the remote management mediating apparatus 12, the management target device information registration unit 334 additionally registers the management target device information on the management target device 14a in the management target device information storage unit 330 (step S613). Then, the device mediating apparatus 13a (the remote management mediating apparatus communication unit 331) transmits a notification of completion of addition of management target device information to the remote management mediating apparatus 12 (step S614). In the remote management mediating apparatus 12, when the response data reception unit 324 receives the completion notification transmitted from the device mediating apparatus 13, the association information registration unit 326 adds the association between the management target device 14a and the device mediating apparatus 13a to the first association information stored in the association information storage unit 320 (step S615).

Example of First Association Information

FIG. 8 is a diagram illustrating an example of first association information stored in an association information storage unit 320 in the remote management system 10 according to the first embodiment of the present disclosure. As illustrated in FIG. 8, in the first association information, the management target device 14 is associated with the device mediating apparatus 13 (a device mediating apparatus 13 capable of performing communication by a communication method supported by the management target device 14).

The first association information is stored in the association information storage unit 320 of the remote management mediating apparatus 12. The first association information is referred to by the device mediating apparatus identification unit 322 of the remote management mediating apparatus 12 when identifying the device mediating apparatus 13 used for communication with the management target device 14. For example, when the identifier of the management target device 14 of the destination of the request data is "DEVICE 333333", the device mediating apparatus identification unit 322 communicates with the management target device 14 based on the first association information illustrated in FIG. 8 and the device mediating apparatus 13 whose identifier is "GATEWAY 12345" is identified as the device mediating apparatus 13 to be used.

Data Structure of Communication Method Definition Information

FIG. 9 is a diagram illustrating an example of a data structure of communication method definition information stored in a communication method definition information storage unit 310 in the remote management system 10 according to the first embodiment of the present disclosure. The communication method definition information defines the communication method supported by the management target device 14.

In the example illustrated in FIG. 9, the communication method definition information is configured to include "communication protocol type", "available device type", "communication port", and "communication protocol detailed definition" as data items.

The "communication protocol type" is set with information for identifying a communication protocol that the management target device 14 can use, such as HTTP, SNMP, ICMP, MQTT, and the like. The "available device type" is set with the type of the management target device 14 that can use the communication method. The "communication port" is, for example, "80/tcp", and communication port information used for communication with the management target device 14 is set. In "communication protocol detailed definition", a detailed definition for each communication protocol is set.

Communication method definition information having such a data structure is set in the device mediating apparatus 13 capable of communicating with the newly added management target device 14, for example, at the request of the remote device management apparatus 11. Thus, the device mediating apparatus 13 can identify the communication method to be used when communicating with the management target device 14.

Data Structure of Management Target Device Information

FIG. 10 is a diagram illustrating an example of a data structure of management target device information stored in the management target device information storage unit 330 in the remote management system 10 according to the first embodiment of the present disclosure. The management target device information is communication settings information related to the management target device 14.

In the example illustrated in FIG. 10, the management target device information includes "device identifier", "device type", "Internet Protocol (IP) address", and "additional information" as data items.

The "device identifier" is identification information for uniquely identifying the management target device 14. For example, a MAC address or the like can be used as the identification information. The "device type" is information indicating the type of the management target device 14. The "device type" is used to associate the management target device 14 with the communication method definition information. The IP address of the management target device 14 is set in "IP address". As the "additional information", a monitoring interval, a network interface (I/F) used for communication, and the like are set.

The management target device information having such a data structure is additionally registered in the management target device information storage unit 330 of the device mediating apparatus 13 capable of communicating with the newly added management target device 14 at the request of the remote device management apparatus 11, for example, when a management target device 14 is newly added. Thus, the device mediating apparatus 13 can identify the communication settings used when communicating with the management target device 14.

Process of Executing Task by Remote Management System

Figure 11:
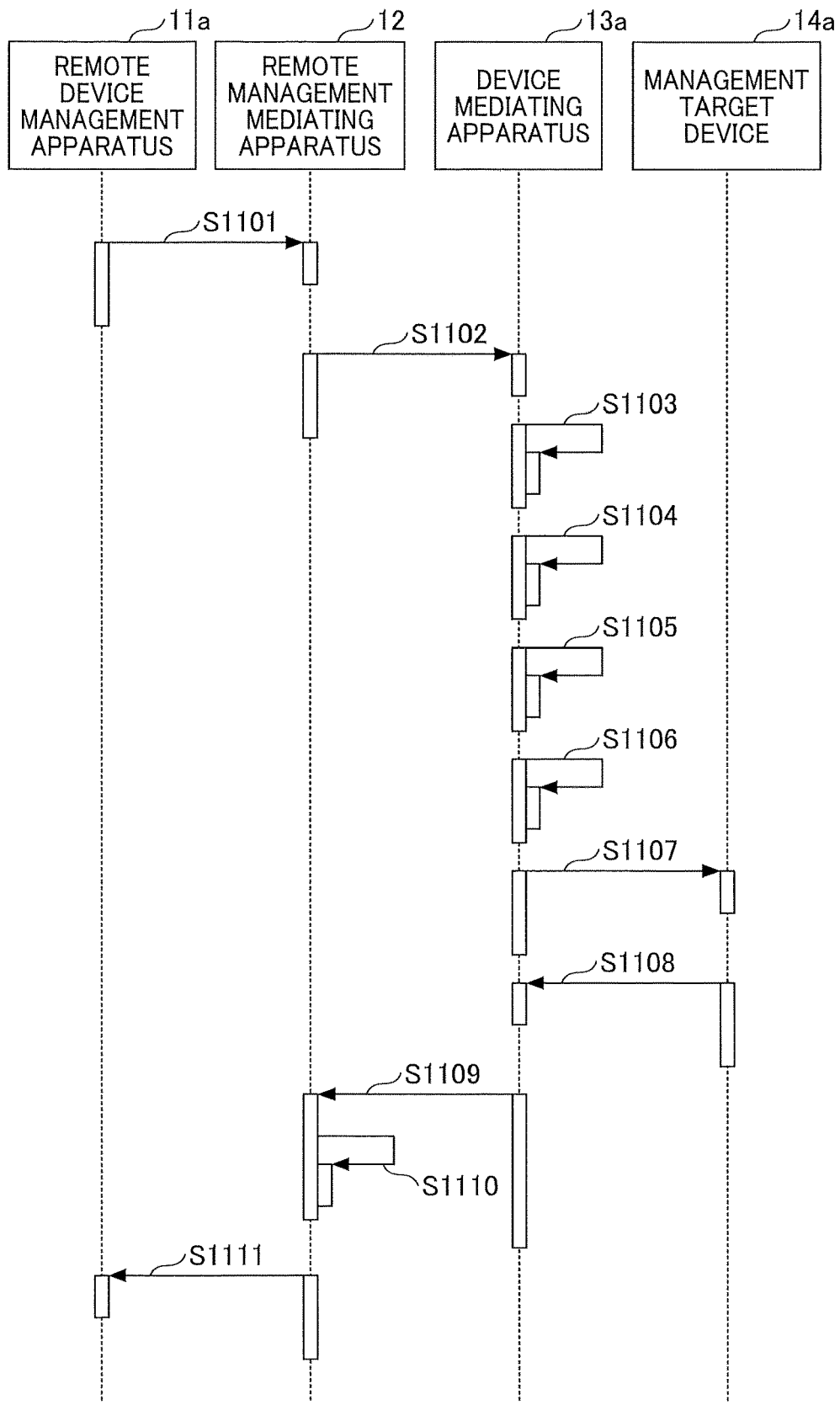
FIG. 11 is a sequence diagram illustrating a process of task execution by the remote management system according to the first embodiment of the present disclosure.

FIG. 11 is a sequence diagram illustrating a process of task execution by the remote management system according to the first embodiment of the present disclosure. Here, an example is described in which the remote device management apparatus 11a registers task execution information in the device mediating apparatus 13a, and the device mediating apparatus 13a periodically acquires information on the management target device 14a and provides the information to the remote device management apparatus 11a.

First, the remote device management apparatus 11a (request data transmission unit 311) transmits a registration request for task execution information to the remote management mediating apparatus 12 (step S1101). The task execution information is input, for example, by the device manager 17 (see FIG. 5) to the remote device management apparatus 11a.

In the remote management mediating apparatus 12, when the request data reception unit 321 receives the registration request of the task execution information transmitted from the remote device management apparatus 11a, the request data transfer unit 323 transfers the registration request to the device mediating apparatus 13a (step S1102).

In the device mediating apparatus 13a, when the remote management mediating apparatus communication unit 331 receives the registration request of the task execution information transmitted from the remote management mediating apparatus 12, the task information registration unit 336 registers this task execution information in the task information storage unit 337 (step S1103).

Thereafter, when the device mediating apparatus 13a detects that the task execution timing set in the task execution information has come (step S1104), the communication method identification unit 332 identifies the management target device 14 (in this case, the management target device 14a) to acquire information based on the identification information of the management target device 14 set in the task execution information (step S1105). Then, based on the identification information of the management target device 14a, the communication method definition information, and the management target device information, the communication method identification unit 332 identifies the communication method and communication settings used for communication with the management target device 14a (step S1106). In the example illustrated in FIG. 11, "SNMP protocol" is identified as the communication method used for communication with the management target device 14a.

Then, the management target device communication unit 333 transmits an information acquisition request to the management target device 14a by performing communication with the management target device 14a using the communication method and the communication settings identified in step S1106 (step S1107).

In the management target device 14a, when the request reception unit 341 receives the information acquisition request transmitted from the device mediating apparatus 13a, the processing unit 342 extracts information corresponding to the information acquisition request from the memory or the like, and the response output unit 343 outputs response including the requested data to the device mediating apparatus 13a (step S1108).

Then, in the device mediating apparatus 13a, when the management target device communication unit 333 receives the response output from the management target device 14a, the remote management mediating apparatus communication unit 331 transmits the response to the remote management mediating apparatus 12 (step S1109).

In the remote management mediating apparatus 12, when the response data reception unit 324 receives the response transmitted from the device mediating apparatus 13a, the response data transfer unit 325 identifies the remote device management apparatus 11a as the transfer destination of the response based on the identification information of the device mediating apparatus 13a indicated in the response and the second association information stored in the association information storage unit 320 (step S1110).

Then, the response data transfer unit 325 transfers the response to the remote device management apparatus 11a (step S1111). In the remote device management apparatus 11a, when the response data reception unit 312 receives the response transmitted from the remote management mediating apparatus 12, the remote management system 10 completes the process illustrated in FIG. 4.

The remote device management apparatus 11a can process the information contained in the response (that is, the information extracted in the management target device 14a) in various ways depending on the purpose of information acquisition, such as display, storage, calculation, analysis, transmission, printing, etc.

The remote management system 10 executes the above-described processes of steps S1104 to S1111 each time the task execution timing set in the task execution information arrives. Thus, the remote device management apparatus 11a can periodically obtain information on the management target device 14a without transmitting the information acquisition request.

Restarting Process of Device Mediating Apparatus by Remote Management System

Figure 12:
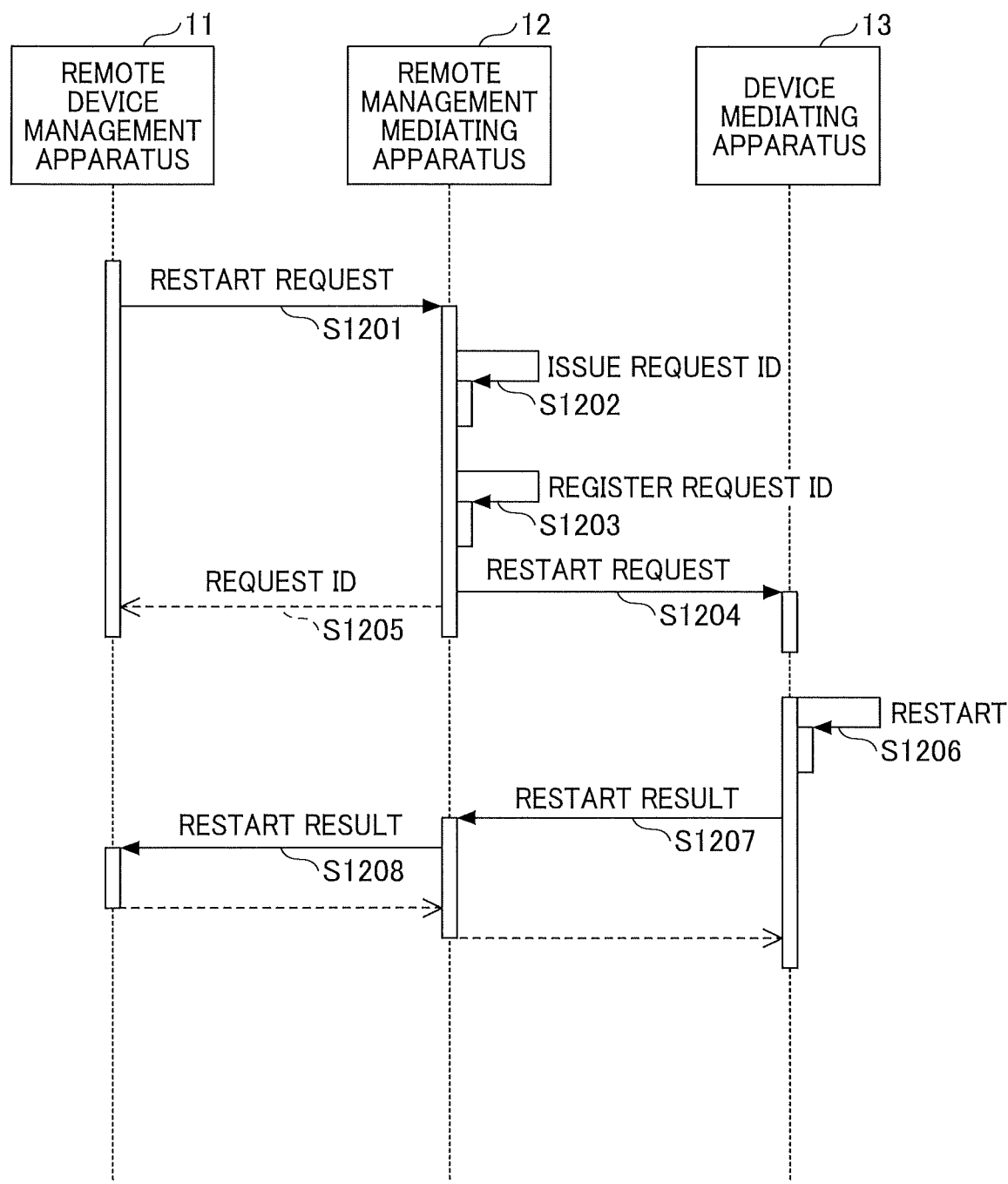
FIG. 12 is a sequence diagram illustrating a restart process of the device mediating apparatus by the remote management system according to the first embodiment of the present disclosure.
Figures 13, 14:
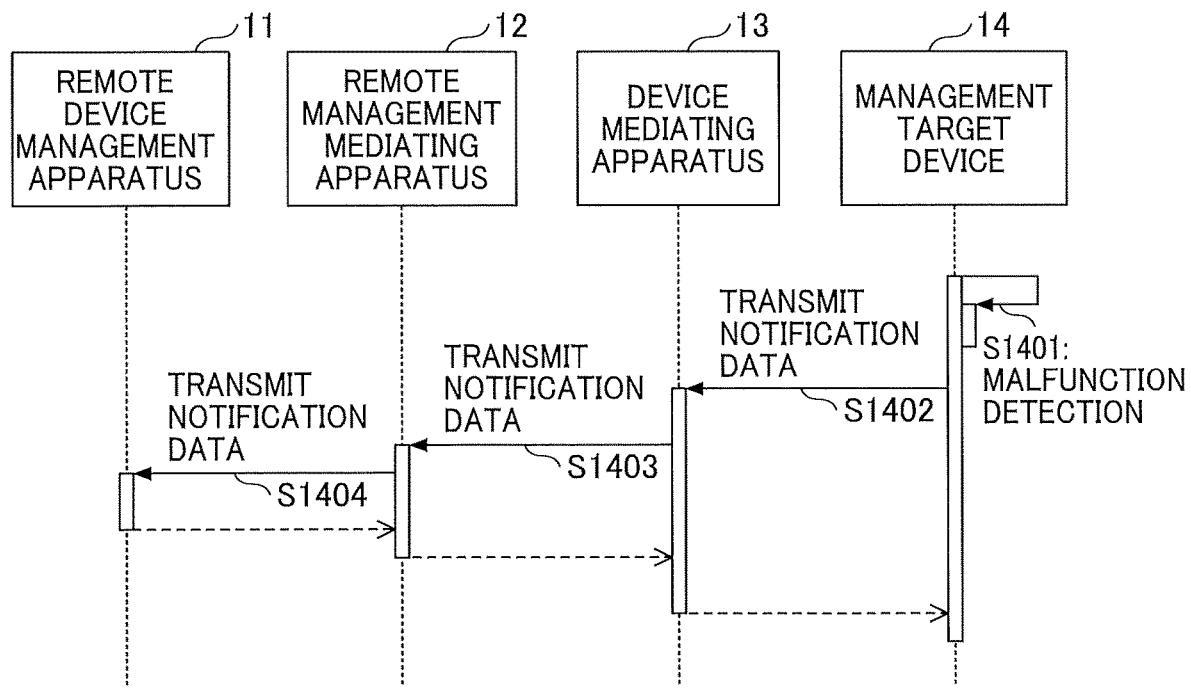
FIG. 13 is a diagram illustrating an example of a request management table stored in the association information storage unit in the remote management system according to the first embodiment of the present disclosure.
FIG. 14 is a sequence diagram illustrating a malfunction notification process of a management target device by the remote management system according to the first embodiment of the present disclosure.

Next, with reference to FIG. 12 and FIG. 13, a restart process of the device mediating apparatus 13 by the remote management system 10 is described. FIG. 12 is a sequence diagram illustrating a restart process of the device mediating apparatus 13 by the remote management system 10 according to the first embodiment of the present disclosure. FIG. 13 is a diagram illustrating an example of a request management table stored in the association information storage unit 320 in the remote management system 10 according to the first embodiment of the present disclosure. An example of restarting the device mediating apparatus 13 from the remote device management apparatus 11 is described as an example of the remote management process illustrated in FIG. 4.

In step S1201, the request data transmission unit 311 of the remote device management apparatus 11 transmits a restart request for the device mediating apparatus 13 to the remote management mediating apparatus 12.

In the remote management mediating apparatus 12, when the request data reception unit 321 receives the restart request, the association information registration unit 326 issues a request ID for uniquely identifying the restart request in step S1202. In step S1203, the association information registration unit 326 registers the request ID issued in step S1202 in the request management table stored in the association information storage unit 320.

For example, as illustrated in FIG. 13, the association information registration unit 326 associates the request ID, the application ID of the remote device management apparatus 11 of the restart request source, and the device mediating apparatus ID of the device mediating apparatus 13 of the restart request data destination and registers the same in the request management table.

In the remote management mediating apparatus 12, the request data transfer unit 323 transfers the restart request together with the request ID to the device mediating apparatus 13 (step S1204). Further, the response data transfer unit 325 transmits the request ID issued in step S1202 to the remote device management apparatus 11 (step S1205).

In the device mediating apparatus 13, when the remote management mediating apparatus communication unit 331 receives the request ID and the restart request transmitted from the remote management mediating apparatus 12, the control unit 338 restarts the device mediating apparatus 13 (step S1206). Then, the remote management mediating apparatus communication unit 331 transmits a restart result to the remote management mediating apparatus 12 together with the request ID (step S1207).

In the remote management mediating apparatus 12, when the response data reception unit 324 receives the request ID and the restart result transmitted from the device mediating apparatus 13, the response data transfer unit 325 transfers the request ID and the restart result to the remote device management apparatus 11 (step S1208).

At this time, the response data transfer unit 325 identifies the remote device management apparatus 11 associated with the request ID as the remote device management apparatus 11 of the restart request source by referring to the request management table and transfers the request ID and the restart result to the remote device management apparatus 11.

Then, in the remote device management apparatus 11, when the response data reception unit 312 receives the request ID and the restart result, the remote management system 10 completes the process illustrated in FIG. 12.

In the remote management system 10, other processing for the device mediating apparatus 13 (for example, acquiring a log of the device mediating apparatus 13, updating the firmware of the device mediating apparatus 13, etc.) can be executed at the request of the remote device management apparatus 11, by the process illustrated in FIG. 12.

Malfunction Notification Process of Management Target Device Executed by Remote Management System FIG. 14 is a sequence diagram illustrating a malfunction notification process of the management target device 14 executed by the remote management system 10 according to the first embodiment of the present disclosure.

First, when a malfunction occurs in the management target device 14 and the management target device 14 detects this malfunction (step S1401), the notification data transmission unit 344 sends notification data for notifying this malfunction to the device mediating apparatus 13 with an identifier of the management target device 14 (step S1402).

In the device mediating apparatus 13, when the notification data transfer unit 339 receives the notification data transmitted from the management target device 14 and the identifier of the management target device 14, the notification data and the identifier of the management target device 14 are transferred to the remote management mediating apparatus 12 (step S1403).

In the remote management mediating apparatus 12, when the response data reception unit 324 receives the notification data transmitted from the management target device 14 and the identifier of the management target device 14, the response data transfer unit 325 transfers the notification data and the identifier of the management target device 14 to the remote device management apparatus 11 (step S1404).

At this time, the response data transfer unit 325 identifies the remote device management apparatus 11 associated with the device mediating apparatus 13 as the remote device management apparatus 11 of the transmission destination of notification data, by referring to the registration number management table (see FIG. 6) and transfers the notification data and the identifier of the management target device 14 to the remote device management apparatus 11.

In the remote device management apparatus 11, when the response data reception unit 312 receives the notification data and the identifier of the management target device 14 transmitted from the remote management mediating apparatus 12, a predetermined process (for example, an alert display indicating that a malfunction has occurred in the management target device 14) according to the notification data and the identifier of the management target device 14 is executed.

In the remote management system 10, various other notifications from the management target device 14 to the remote device management apparatus 11 (for example, warning of remaining consumables, notification of voice input from microphone, etc.) can be transmitted by the process illustrated in FIG. 14.

Reinstallation Process of the Device Mediating Apparatus by the Remote Management System The reinstallation process of the device mediating apparatus 13 by the remote management system 10 is described with reference to FIG. 15 to FIG. 17.

For example, when the device mediating apparatus 13 fails, it is necessary to replace the device mediating apparatus 13 with a new one. At this time, if various settings (for example, association with the remote device management apparatus 11) regarding the new device mediating apparatus 13 are performed in the same manner as at the time of new registration, the service provided to the customer may be degraded since it may cause prolonged downtime. The remote management system 10 according to the present embodiment can easily perform various settings relating to the new device mediating apparatus 13 in a short time so as to avoid the occurrence of such a situation.

First, a process to reissue the registration number by the remote management system 10 is described with reference to FIG. 15, FIG. 16A, and FIG. 16B. FIG. 15 is a sequence diagram illustrating a registration number reissue process executed by the remote management system 10 according to the first embodiment of the present disclosure. FIG. 16A and FIG. 16B are diagrams illustrating an example of the second association information (registration number management table) stored in the association information storage unit 320 in the remote management system 10 according to the first embodiment of the present disclosure.

The registration number management table illustrated in FIG. 16 is similar to the registration number management table illustrated in FIG. 6. However, the registration number management table illustrated in FIG. 16 is different from the registration number management table illustrated in FIG. 6 in that second association information is added by the process described in FIG. 15 and FIG. 17.

First, in the remote device management apparatus 11, the request data transmission unit 311 transmits a registration number issuance request to the remote management mediating apparatus 12 (step S1501). The registration number issuance request includes the application ID of the remote device management apparatus 11 and the device mediating apparatus ID of the device mediating apparatus 13.

In the remote management mediating apparatus 12, when the request data reception unit 321 receives the registration number issuance request, the association information registration unit 326 issues a new registration number (step S1502). Then, the association information registration unit 326 associates the registration number issued in step S1502, the application ID of the remote device management apparatus 11, and the device mediating apparatus ID of the device mediating apparatus 13, and registers the same in the association information storage unit 320 (registration number management table) of the remote management mediating apparatus 12 (step S1503).

For example, in step S1502, it is assumed that "112234" is issued as a registration number. Further, it is assumed that an application ID which is an identifier of the remote device management apparatus 11a (device management application) is "APPLICATION_A". Also, it is assumed that the device mediating apparatus ID of the device mediating apparatus 13 is "Gateway 12347". In this case, in step S1503, the association information registration unit 326 associates the registration number "112234", the application ID "APPLICATION_A", and the device mediating apparatus ID "Gateway 12347" and registers the same in the association information storage unit 320 (registration number management table) of the remote management mediating apparatus 12 as illustrated in FIG. 16A.

Furthermore, in the remote management mediating apparatus 12, the response data transfer unit 325 transmits the registration number issued in step S1502 to the remote device management apparatus 11 (step S1504).

In the remote device management apparatus 11, when the response data reception unit 312 receives the registration number transmitted from the remote management mediating apparatus 12, a process illustrated in FIG. 15 is completed.

Figure 17:
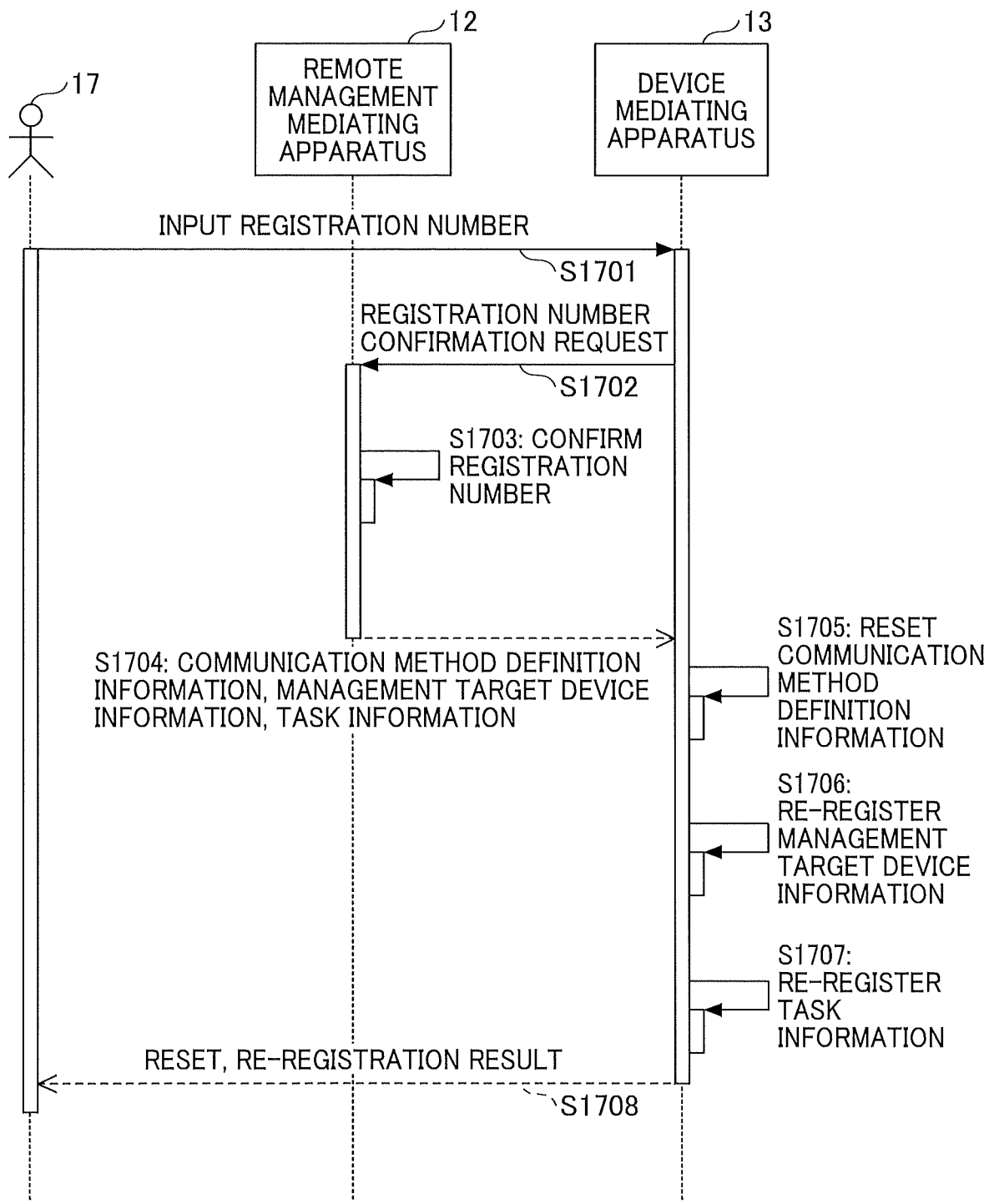
FIG. 17 is a sequence diagram illustrating a resetting process for the device mediating apparatus executed by the remote management system according to the first embodiment of the present disclosure.

Next, with reference to FIG. 16A, FIG. 16B, and FIG. 17, the resetting process of the device mediating apparatus 13 by the remote management system 10 is described. FIG. 17 is a sequence diagram illustrating a resetting process of the device mediating apparatus 13 by the remote management system 10 according to the first embodiment of the present disclosure.

First, the device manager 17 inputs the registration number issued for the newly installed device mediating apparatus 13 in the process illustrated in FIG. 15 to the device mediating apparatus 13 (step S1701). In response to the input, in the device mediating apparatus 13, the remote management mediating apparatus communication unit 331 transmits a registration number confirmation request including the input registration number to the remote management mediating apparatus 12 (step S1702).

In the remote management mediating apparatus 12, when the response data reception unit 324 receives the registration number confirmation request transmitted from the device mediating apparatus 13, the settings information supply unit 327 confirms the registration number included in the registration number confirmation request (the registration number issued for the device mediating apparatus 13) (step S1703). Specifically, the settings information supply unit 327 confirms that the registration number included in the registration number confirmation request is registered in the registration number management table (see FIG. 16) and associated with the device mediating apparatus 13 (device mediating apparatus ID).

When the registration number included in the registration number confirmation request is registered in the registration number management table and is associated with the device mediating apparatus 13, the settings information supply unit 327 acquires various settings information (the communication method definition information, the management target device information, and the task information) set in the device mediating apparatus 13 before replacement.

For example, by storing various settings information of the device mediating apparatus 13 before replacement in advance in the storage unit, the settings information supply unit 327 can acquire the various settings information from the storage unit. In this case, the storage unit may be included in the device mediating apparatus 13 or may be provided outside the device mediating apparatus 13.

Then, the settings information supply unit 327 transmits the various settings information to the device mediating apparatus 13 (device mediating apparatus 13 after replacement) (step S1704).

However, the settings information supply unit 327 returns an error to the device mediating apparatus 13 if any of the following applies.

When the registration number is not registered in the registration number management table. When "X (used flag)" is set in the data item "used" for the registration number. When a registration number confirmation request is received from a device mediating apparatus 13 different from the device mediating apparatus 13 associated with the registration number.

In the device mediating apparatus 13, when the remote management mediating apparatus communication unit 331 receives the various settings information transmitted from the remote management mediating apparatus 12, the communication method definition information setting unit 335 resets the received communication method definition information to the device mediating apparatus 13 (step S1705). Also, the management target device information registration unit 334 re-registers the received management target device information in the management target device information storage unit 330 of the device mediating apparatus 13 (step S1706). Further, the task information registration unit 336 re-registers the received task information in the task information storage unit 337 of the device mediating apparatus 13 (step S1707).

After that, the remote management mediating apparatus communication unit 331 of the device mediating apparatus 13 notifies the device manager 17 of the result of resetting and re-registration of the various settings information (step S1708). Then, the remote management system 10 completes the process illustrated in FIG. 17.

As described above, in the remote management system 10 according to the first embodiment of the present disclosure, the remote management mediating apparatus 12 identifies the device mediating apparatus 13 capable of communicating by a communication method supported by the management target device 14 and transfers the request data from the remote device management apparatus 11 to the identified device mediating apparatus 13. Therefore, in the remote management system 10, when adding a new electronic device as the management target device 14, the management target device 14 can be remotely managed by setting the remote management mediating apparatus 12 identify the device mediating apparatus 13 capable of communicating with the management target device 14. According to the remote management system 10, various electronic devices using various communication methods can be easily added as the management target device.

In particular, in the remote management system 10, a device mediating apparatus 13 capable of communicating with the management target device 14 is identified by referring to the first association information in which the management target device 14 and the device mediating apparatus 13 are associated with each other. Therefore, according to the remote management system 10, when adding a new electronic device as the management target device 14, by making simple settings such as adding the association between the management target device 14 and the device mediating apparatus 13 to the first association information, the management target device 14 can be remotely managed.

Further, in the remote management system 10, the remote management mediating apparatus 12 refers to the second association information in which the device mediating apparatus 13 is associated with the remote device management apparatus 11 and identifies the remote device management apparatus 11 associated with the device mediating apparatus 13 that is the transmission source of the response, as the remote device management apparatus 11 of the transfer destination of the response. For this reason, according to the remote management system 10, even when a plurality of remote device management apparatuses 11 are provided, the transfer destination of the response data output from the management target device 14 can be easily and reliably identified.

Further, in the remote management system 10, the device mediating apparatus 13 identifies the communication method supported by the management target device 14 by referring to the communication method definition information, and communication with the management target device 14 is performed by the identified communication method. Therefore, according to the remote management system 10, when adding a new electronic device as the management target device 14, the device mediating apparatus 13 can communicate with the management target device 14 using an appropriate communication method by setting the communication method supported by the management target device 14 in the communication method definition information.

Further, in the remote management system 10, when the management target device 14 is newly added, communication method definition information on the management target device 14 and management target device information on which communication settings information on the management target device is set are set and registered dynamically for the device mediating apparatus 13. Therefore, according to the remote management system 10, even if the system administrator does not manually set the communication method definition information and the management target device information for the device mediating apparatus 13, the communication method definition information and the management target device information can be used by the device mediating apparatus 13.

Further, in the remote management system 10, when the device mediating apparatus 13 is replaced, settings information (task execution information, management target device information, and communication method definition information) set in the device mediating apparatus 13 before replacement are acquired. By supplying the settings information to the device mediating apparatus 13 after replacement, the settings information is reset in the device mediating apparatus 13 after replacement. Therefore, according to the remote management system 10, the electronic device can be easily added as the management target device 14, and various settings information for the device mediating apparatus 13 can be easily reset.

In addition, in the remote management system 10, when the device mediating apparatus 13 is replaced, the second association information (the second association information in which the device mediating apparatus 13 and the remote device management apparatus 11 are associated) related to the device mediating apparatus 13 before replacement is made to re-register as second association information on the device mediating apparatus 13 after replacement. Therefore, according to the remote management system 10, the electronic device can be easily added as the management target device 14, and various settings information for the device mediating apparatus 13 can be easily reset.

In the first embodiment, the function of the remote management mediating apparatus 12 may be implemented by one device or may be implemented by a plurality of devices. For example, part of the functions of the remote management mediating apparatus 12 may be provided in an apparatus outside the remote management mediating apparatus 12.

Similarly, in the first embodiment, the function of the device mediating apparatus 13 may be implemented by one device or may be implemented by a plurality of devices. For example, part of the functions of the device mediating apparatus 13 may be provided in an apparatus outside the device mediating apparatus 13.

Second Embodiment

Figure 18:
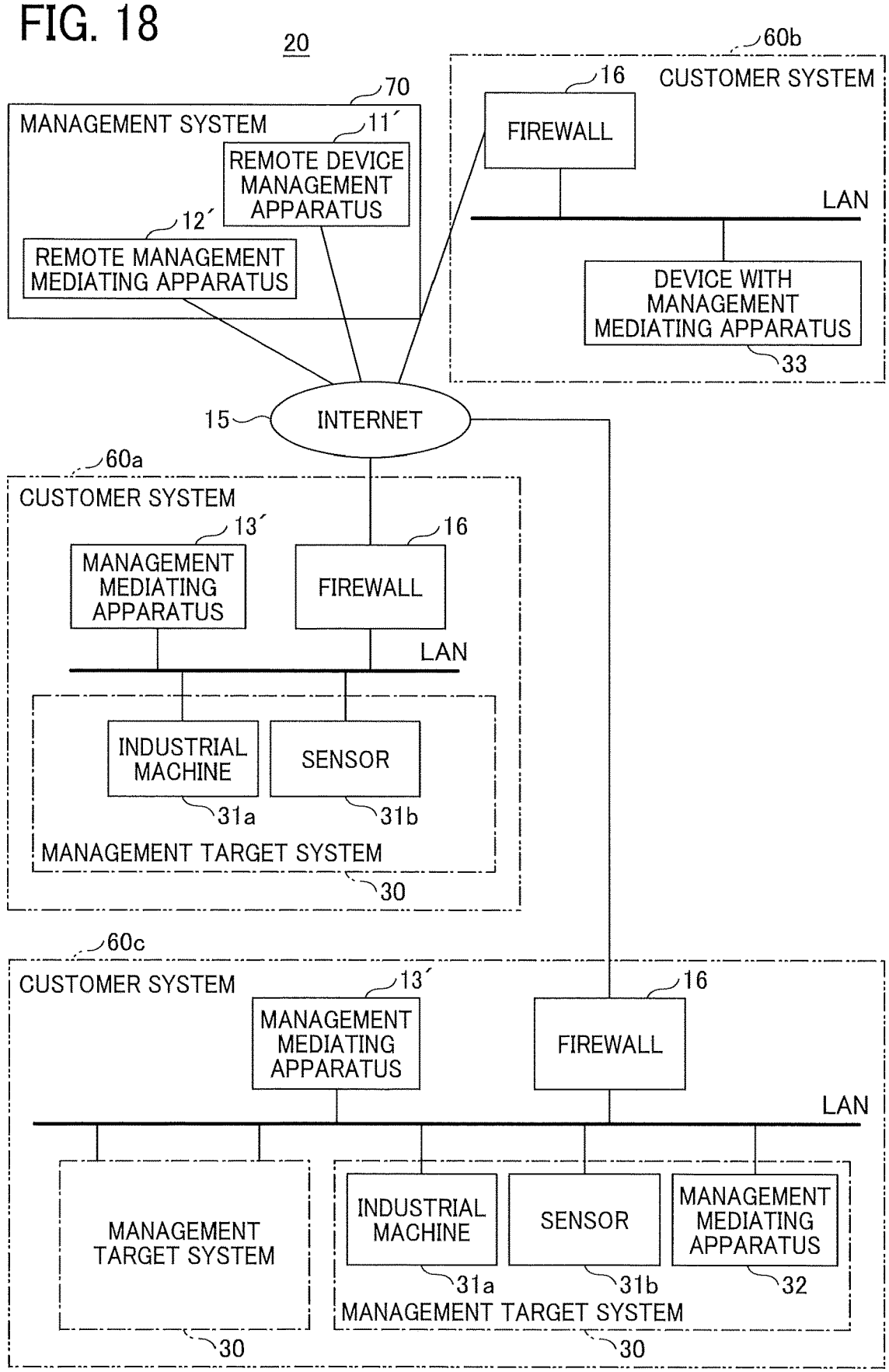
FIG. 18 is a diagram illustrating an entire configuration of an industrial machine management system according to a second embodiment of the present disclosure.

Hereinafter, a second embodiment of the present disclosure is described with reference to FIG. 18. In the second embodiment, an example of applying the present disclosure to an industrial machine management system is described. FIG. 18 is a diagram illustrating an entire configuration of an industrial machine management system 20 according to the second embodiment of the present disclosure. The industrial machine management system 20 is an example of the "remote management system" described in the claims.

As illustrated in FIG. 18, the industrial machine management system 20 according to the second embodiment includes a customer system 60a, a customer system 60b, a customer system 60c, and a management system 70. The customer systems 60a, 60b, 60c and the management system 70 are all connected to the internet 15. In particular, the customer systems 60a, 60b, 60c are all connected to the internet 15 through the firewall 16 provided in the customer systems.

The customer system 60a is a system installed at a customer site. The customer system 60a is configured to include a management mediating apparatus 13', a management target system 30, and a firewall 16. The management target system 30 is a target system of remote management by the management system 70.

In the example illustrated in FIG. 18, the management target system 30 includes an industrial machine 31a and a sensor 3b. The industrial machine 31a and the sensor 31b are examples of the "management target device" described in the claims and have the same function as the management target device 14 of the first embodiment. The industrial machine 31a is, for example, a processing machine, a transport machine, an inspection machine or the like. The sensor 31b is, for example, an imaging device, a sound collecting device, or the like.

The management mediating apparatus 13' is an example of the "device mediating apparatus" described in the claims and has the same function as the device mediating apparatus 13 of the first embodiment. The management mediating apparatus 13' is connected to the management target system 30 and the firewall 16 by a local area network (LAN). The management mediating apparatus 13' has a firmware updating function of updating the firmware provided in the industrial machine 31a and the sensor 31b using the internet connection.

The customer system 60b is a system installed at another customer site. The customer system 60b includes the device with management mediating apparatus 33 and the firewall 16. The device with management mediating apparatus 33 is a device to be remotely managed by the management system 70. The device with management mediating apparatus 33 is an example of the "management target device" and the "device mediating apparatus" described in the claims and has the functions similar to those of the management target device 14 and the device mediating apparatus 13 of the first embodiment.

The device with management mediating apparatus 33 is, for example, an industrial machine (for example, a processing machine, a transport machine, an inspection machine or the like), a sensor (for example, an imaging device, a sound collecting device or the like) or the like. The device with management mediating apparatus 33 is connected to the firewall 16 by a LAN. The device with management mediating apparatus 33 has a firmware update function of updating the firmware provided in the device with management mediating apparatus 33 using the internet connection.

The customer system 60c is a system installed at still another customer site. The customer system 60c includes a management mediating apparatus 13', a plurality of management target systems 30, and a firewall 16. Each management target system 30 is a system to be managed by the management system 70.

In the example illustrated in FIG. 18, one management target system 30 includes an industrial machine 31a, a sensor 31b, and a management mediating apparatus 32. The industrial machine 31a and the sensor 31b are examples of "management target device" described in the claims and have the same function as the management target device 14 of the first embodiment. The industrial machine 31a is, for example, a processing machine, a transport machine, an inspection machine or the like. The sensor 31b is, for example, an imaging device, a sound collecting device, or the like.

The management mediating apparatus 13' and 32 are examples of "device mediating apparatus" described in the claims and have the same functions as the device mediating apparatus 13 of the first embodiment. The management mediating apparatuses 13' and 32 are connected to a plurality of management target system 30 and a firewall 16 by a LAN.

The management mediating apparatuses 13' and 32 have a firmware update function of updating the firmware provided in the industrial machine 31a and the sensor 31b using the internet connection.

In the customer system 60c, since the load is heavy only with the management mediating apparatus 13', the management mediating apparatus 32 is further provided. Then, the firmware of the industrial machine 31a and the sensor 31b in the management target system 30 is updated by the management mediating apparatus 32. On the other hand, the function of centrally performing remote management of a plurality of management target systems 30 using the internet connection with the management system 70 is performed by the management mediating apparatus 13'.

The management system 70 is a system for remotely managing the management target devices (the industrial machine 31a, the sensor 31b, and the device with management mediating apparatus 33) of each of the customer systems 60a, 60b, 60c through the internet 15. In the example illustrated in FIG. 18, the management system 70 includes a remote device management apparatus 11' and a remote management mediating apparatus 12'.

The remote device management apparatus 11' has the same function as the remote device management apparatus 11 described in the first embodiment. The remote management mediating apparatus 12' has the same function as the remote management mediating apparatus 12 described in the first embodiment. For example, the management system 70 performs various operating instructions (for example, settings changes, firmware updates, power on, power off, etc.) to each management target device of each customer system 60a, 60b, and 60c, or acquire various information (status information, settings value information, log information, etc.) from the management target devices of each customer system 60a, 60b, and 60c.

In the industrial machine management system 20, the remote device management apparatus 11', the remote management mediating apparatus 12', the management mediating apparatus 13', the management mediating apparatus 32, and the device with management mediating apparatus 33 include general computer elements. That is, similar to the hardware configuration illustrated in FIG. 2, these devices at least include a CPU that executes various programs, a ROM, a RAM, a storage unit that the CPU uses for program processing, and a communication unit such as a modem and a network interface, etc.

In the industrial machine management system 20 configured in this way, as in the remote management system 10 of the first embodiment, the remote management mediating apparatus 12' of the management system 70 identifies a device mediating apparatus (management mediating apparatus 13', management mediating apparatus 32, or device with management mediating apparatus 33) possible to communicate using the communication method supported by the management target device (the industrial machine 31a, the sensor 31b, or the device with management mediating apparatus 33) and transfers request data from the remote device management apparatus 11' of the management system 70 to the identified device mediating apparatus.

Therefore, in the industrial machine management system 20, when adding a new electronic device as a management target device, by configuring the remote management mediating apparatus 12' to identify the device mediating apparatus that can communicate with the management target device, the management target device can be managed remotely. Therefore, according to the industrial machine management system 20, various electronic devices using various communication methods can be easily added as the management target devices.

Further, in the industrial machine management system 20, as in the remote management system 10 of the first embodiment, when the device mediating apparatus (management mediating apparatus 13', management mediating apparatus 32, or device with management mediating apparatus 33) is replaced, by acquiring settings information (task execution information, management target device information, and communication method definition information) for remote management that has been set in the device mediating apparatus before replacement and supplying the settings information to the device mediating apparatus after replacement, the settings information can be reset to the device mediating apparatus after replacement. Therefore, according to the industrial machine management system 20, the industrial machine 31a and the sensor 31b (electronic device) can be easily added as the management target device, and various settings information for the device mediating apparatus can be reset easily.

Further, in the industrial machine management system 20, as in the remote management system 10 of the first embodiment, when the device mediating apparatus (management mediating apparatus 13', management mediating apparatus 32, or device with management mediating apparatus 33) is replaced, the second association information (the second association information in which the device mediating apparatus is associated with the remote device management apparatus 11') of the device mediating apparatus before replacement can be re-registered as second association information of the new device mediating apparatus. Therefore, according to the industrial machine management system 20, the industrial machine 31a and the sensor 31b (electronic device) can be easily added as the management target device, and various settings information for the device mediating apparatus can be reset easily.

The management target device to be managed by the remote management system of the present disclosure is not limited to the image forming apparatus, but may be a network appliance, vending machine, medical equipment, industrial machine, power supply unit, air conditioning system, or a device having a communication function in a measurement system such as gas, water, electricity and the like. Further, the management target device may be various detection devices (for example, an imaging device, a sound collecting device, and the like) which are installed around any one of the devices described above and detect the state of the device.

For example, as an industrial machine, a processing apparatus, an inspection apparatus, a conveyance apparatus, a picking apparatus, etc., can be considered. When management target device is an industrial machine, information such as the identification information of the device, the operation status of the device, the presence or absence of abnormal operation, information on the replacement time of consumables, the inspection result by the device, etc., may be transmitted as response to the management system 70 using various information transfer style such as data format or image format.

Also, for example, as a medical device, a fundus examination apparatus, an X-ray examination apparatus, a sphygmomanometer, a body fat scale, a visual acuity meter, a pacemaker and the like can be considered. When management target device is a medical device, the identification information of the device, the operating status of the device, the presence or absence of abnormal operation, the measurement results by the device, etc. may be transmitted as response to the management system 70 using various information transfer style such as data format or image format.

Although the preferred embodiments of the present disclosure have been described above in detail, the present disclosure is not limited to these embodiments, and various modifications or changes may be made within the scope of the present disclosure as set forth in the claims. Thus, numerous additional modifications and variations are possible in light of the above teachings. For example, elements and/or features of different illustrative embodiments may be combined with each other and/or substituted for each other within the scope of the present disclosure. In addition, any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A remote management mediating apparatus comprising:
   a processor; and
   a memory storing program instructions that cause the processor to:
      receive request data issued from a remote device management apparatus to a management target device, the management target device being a management target device remotely managed by the remote device management apparatus;
      identify a first device mediating apparatus capable of communicating by a communication method supported by the management target device; and
      transfer the received request data to the first device mediating apparatus, wherein
      in a case where the first device mediating apparatus is replaced with a second device mediating apparatus, the processor is further configured to:
         acquire settings information for remote management that is set in the first device mediating apparatus;
         supply the settings information to the second device mediating apparatus; and
         reset the settings information to the second device mediating apparatus, and
      in a case where a third device mediating apparatus is provided, the processor is further configured to:
         issue an identification number of association information of the third device mediating apparatus in response to the request data from the remote device management apparatus; and
         register the association information associating the third device mediating apparatus with the remote device management apparatus from which the request data source was received in a management table in a case where an identification number input from the third device mediating apparatus matches the issued identification number.

2. The remote management mediating apparatus of claim 1, wherein the settings information includes at least one of;
   task execution information in which an execution schedule for communication with the management target device is defined;

management target device information for which communication settings information related to the management target device is set; and communication method definition information in which the communication method supported by the management target device is defined.

3. The remote management mediating apparatus of claim 1, wherein the processor is further configured to:
receive response data according to the request data from the management target device through the first device mediating apparatus; and
transfer the response data to the remote device management apparatus associated with the first device mediating apparatus that is a transmission source of the response data in association information associating the first device mediating apparatus and the remote device management apparatus.

4. The remote management mediating apparatus of claim 1 wherein, in a case where the first device mediating apparatus is replaced, the processor is further configured to register in the management table, association information having the same content as the association information of the first device mediating apparatus before replacement, as the association information of the second device mediating apparatus.

5. The remote management mediating apparatus of claim 3, wherein the processor is further configured to:
receive the request data for the first device mediating apparatus from the remote device management apparatus;
transfer the received request data to the first device mediating apparatus;
receive the response data from the first device mediating apparatus in response to the request data; and
transfer the received response data to the remote device management apparatus associated with the first device mediating apparatus that is the source of the received response data.

6. The remote management mediating apparatus of claim 3 wherein the processor is further configured to transfer notification data sent from the management target device and transferred by the first device mediating apparatus to the remote device management apparatus associated with the first device mediating apparatus that is a transfer source of the notification data in the association information.

7. A remote management system comprising:
a remote device management apparatus configured to remotely manage one or more management target devices; and
a remote management mediating apparatus configured to mediate communication between the remote device management apparatus and one or more device mediating apparatuses, the remote management mediating apparatus including:
a memory that stores a plurality of instructions; and
a processor that executes the plurality of instructions, configured to:
receive request data issued from the remote device management apparatus to a management target device, the management target device being one of the one or more management target devices;
identify a first device mediating apparatus from among the one or more device mediating apparatuses that is capable of communicating by a communication method supported by the management target device;
transfer the received request data to the first device mediating apparatus, wherein
in a case where the first device mediating apparatus is replaced with a second device mediating apparatus the processor is further configured to:
acquire settings information for remote management set in the device mediating apparatus;
supply the settings information to the second device mediating apparatus; and
reset the settings information to the second device mediating apparatus, and
in a case where a third device mediating apparatus is provided, the processor is further configured to:
issue an identification number of association information of the third device mediating apparatus in response to the request data from the remote device management apparatus; and
register the association information associating the third device mediating apparatus with the remote device management apparatus from which the request data source was received in a management table in a case where an identification number input from the third device mediating apparatus matches the issued identification number.

8. A remote management method comprising:
receiving request data issued from a remote device management apparatus to a management target device, the management target device being one of one or more management target devices remotely managed by the remote device management apparatus;
identifying a first device mediating apparatus capable of communicating by a communication method supported by the management target device;
transferring the received request data to the first device mediating apparatus, wherein
in a case where the first device mediating apparatus is replaced with as second device mediating apparatus, the method further comprises:
acquiring settings information for remote management set in the device mediating apparatus;
supplying the settings information to the second device mediating apparatus; and
resetting the settings information to the second device mediating apparatus, and
in a case where a third device mediating apparatus is provided, the method further comprises:
issue an identification number of association information of the third device mediating apparatus in response to the request data from the remote device management apparatus; and
register the association information associating the third device mediating apparatus with the remote device management apparatus from which the request data source was received in a management table in a case where an identification number input from the third device mediating apparatus matches the issued identification number.

* * * * *